United States Patent
Lindholm

(10) Patent No.: US 10,489,056 B2
(45) Date of Patent: Nov. 26, 2019

(54) QUEUE MANAGER FOR STREAMING MULTIPROCESSOR SYSTEMS

(71) Applicant: NVIDIA Corporation, Santa Clara, CA (US)

(72) Inventor: John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 30 days.

(21) Appl. No.: 15/808,735

(22) Filed: Nov. 9, 2017

(65) Prior Publication Data
US 2019/0138210 A1    May 9, 2019

(51) Int. Cl.
*G06F 3/06* (2006.01)
*G06F 13/16* (2006.01)
*G06F 13/40* (2006.01)

(52) U.S. Cl.
CPC .............. *G06F 3/061* (2013.01); *G06F 3/067* (2013.01); *G06F 3/0659* (2013.01); *G06F 13/1642* (2013.01); *G06F 13/1652* (2013.01); *G06F 13/1678* (2013.01); *G06F 13/4018* (2013.01)

(58) Field of Classification Search
CPC ........ G06F 3/061; G06F 3/0659; G06F 3/067; G06F 13/1642; G06F 13/1652; G06F 13/1678
USPC .......................................................... 710/5
See application file for complete search history.

(56) References Cited

U.S. PATENT DOCUMENTS

| | | | | |
|---|---|---|---|---|
| 4,430,727 A | * | 2/1984 | Moore | G11C 29/76 711/115 |
| 5,280,598 A | * | 1/1994 | Osaki | G06F 13/4018 710/310 |
| 5,613,078 A | * | 3/1997 | Kishigami | G06F 13/1678 710/307 |
| 5,682,513 A | * | 10/1997 | Candelaria | G06F 11/2064 711/113 |
| 5,717,900 A | * | 2/1998 | Whittaker | G06F 12/0808 711/151 |

(Continued)

FOREIGN PATENT DOCUMENTS

| CN | 102437929 B | 5/2014 |
|---|---|---|
| DE | 19983737 B3 | 5/2014 |
| EP | 0164972 A2 | 12/1985 |

OTHER PUBLICATIONS

"Command Organization and Execution Model," Apple Inc., Jan. 4, 2017, as retrieved by the Internet Archive Wayback Machine, pp. 1-8, retrieved from https://web.archive.org/web/20170104164335/https://developer.apple.com/library/content/documentation/Miscellaneous/Conceptual/MetalProgrammingGuide/Cmd-Submiss/Cmd-Submiss.html.

*Primary Examiner* — Paul R. Myers
(74) *Attorney, Agent, or Firm* — Leydig, Voit & Mayer, Ltd.

(57) ABSTRACT

A queue manager apparatus converts inbound commands of a first width into scalar format commands to be queued in a command queue. Furthermore, the queue manager converts the scalar format commands residing in the command queue into outbound commands of a second width for transmission. Converting inbound commands to scalar format commands and then converting the scalar format commands to a target width for transmission allows the queue manager to advantageously provide efficient and programmable command transmission between arbitrary processing units, (Continued)

regardless of potentially mismatched native command widths.

19 Claims, 17 Drawing Sheets

(56) References Cited

U.S. PATENT DOCUMENTS

| | | | |
|---|---|---|---|
| 5,745,791 A * | 4/1998 | Peek | G06F 13/4018 710/307 |
| 5,767,856 A | 6/1998 | Peterson et al. | |
| 5,768,546 A * | 6/1998 | Kwon | G06F 13/4018 710/307 |
| 5,909,559 A * | 6/1999 | So | G06F 13/4018 710/307 |
| 6,791,980 B1 * | 9/2004 | Li | H04L 45/00 370/390 |
| 7,432,933 B2 | 10/2008 | Walls et al. | |
| 7,970,977 B1 * | 6/2011 | Li | G06F 13/4036 710/306 |
| 8,006,021 B1 * | 8/2011 | Li | G06F 13/4059 710/110 |
| 8,026,912 B1 * | 9/2011 | Danskin | G06T 11/40 345/419 |
| 8,166,237 B1 | 4/2012 | Atsatt et al. | |
| 8,212,825 B1 * | 7/2012 | Everitt | G06T 15/005 345/505 |
| 9,171,525 B2 | 10/2015 | Lindholm | |
| 9,286,114 B2 | 3/2016 | Meixner | |
| 9,324,458 B2 | 4/2016 | Kim et al. | |
| 9,436,634 B2 | 9/2016 | Canepa et al. | |
| 2002/0013874 A1 * | 1/2002 | Gelke | G06F 13/4018 710/305 |
| 2003/0191876 A1 * | 10/2003 | Fallon | G06F 3/0613 710/68 |
| 2005/0010710 A1 * | 1/2005 | Yim | G06F 3/0605 710/307 |
| 2005/0028059 A1 * | 2/2005 | Cote | G01R 31/31855 714/724 |
| 2005/0278783 A1 * | 12/2005 | Chien | G06F 21/552 726/22 |
| 2012/0185859 A1 * | 7/2012 | Kashiwaya | G06F 9/30076 718/100 |
| 2014/0185457 A1 * | 7/2014 | Barnes | H04W 8/005 370/242 |
| 2014/0267328 A1 * | 9/2014 | Banack | G06T 1/20 345/522 |
| 2015/0074676 A1 | 3/2015 | Maruyama | |
| 2015/0293785 A1 | 10/2015 | Murphy | |

* cited by examiner

US 10,489,056 B2

QUEUE MANAGER FOR STREAMING MULTIPROCESSOR SYSTEMS

FIELD OF THE INVENTION

The present invention relates to data processing systems, and more particularly to a queue manager for streaming multiprocessor systems.

BACKGROUND

Certain multiprocessor systems include multiple different fixed-function and programmable processing units. Fixed-function processing units are typically configured to concurrently execute one or more commands that specify common predefined operations, while programmable processing units are typically configured to concurrently execute one or more commands that specify complex multi-threaded programs. The degree of concurrency is a fixed design feature and defines a native width of a given processing unit. Commands and associated data are conventionally transmitted through a command queue linking a source processing unit to a target (destination) processing unit. The command queue is conventionally configured to accept commands and related data according to a fixed native width of the source processing unit and deliver the commands and related data according to a fixed native width of the target processing unit, thereby constraining overall programmability of the multiprocessor system to fixed, predefined connections between specific processing units.

Furthermore, a given command may include a relatively large amount of data, requiring conventional systems to load and traverse associated data to find and evaluate a new command within the command queue. Such traversal can cause data caches to operate inefficiently, thereby reducing system efficiency and performance. Thus, there is a need for addressing these issues and/or other issues associated with the prior art.

SUMMARY

An apparatus, method, and computer readable medium are disclosed for command and data queue management in a multi-processor system. Each command can have a width that defines a number of related indivisible scalar operations than can be executed sequentially or concurrently.

In one embodiment, the apparatus includes a plurality of command queues, and circuitry configured for communication with the command queues. The circuitry is further configured for receiving an inbound command of a first width from a first processing unit, converting the inbound command into one or more scalar format commands, storing the one or more scalar format commands in at least one of the command queues, selecting a first command queue, reading at least one scalar format command from the first command queue, converting the at least one scalar format command into an outbound command of a second width, and sending the outbound command to a destination including a second processing unit for processing the outbound command.

The apparatus may further comprise a plurality of data queues, wherein the circuitry is further configured for sending one or more pointers to the first processing unit for storing data in at least one of the data queues, in connection with the inbound command, and sending the one or more pointers to the second processing unit for loading data from the at least one of the data queues in connection with the outbound command.

DETAILED DESCRIPTION

Figure 1A:
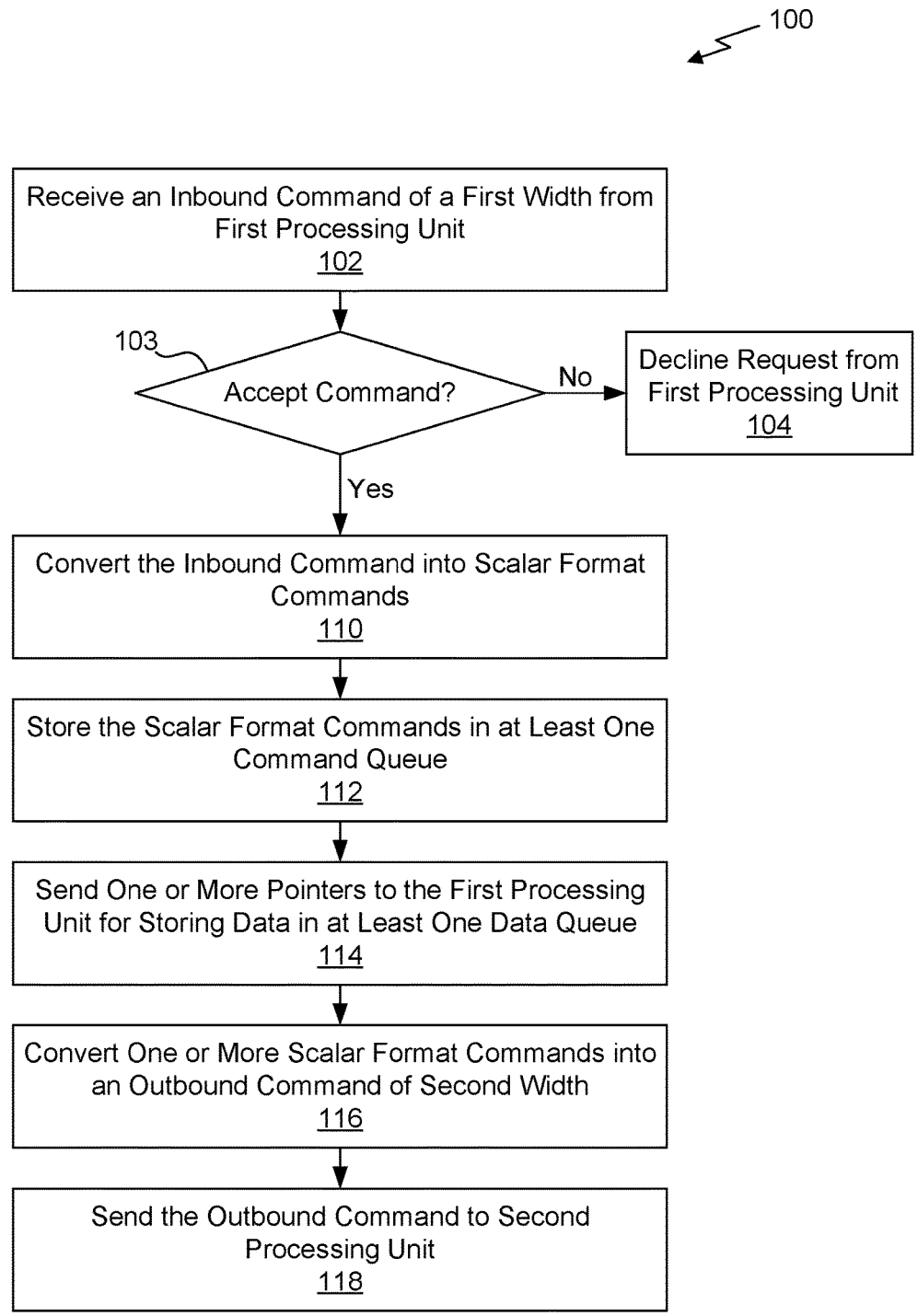
FIG. 1A illustrates a flowchart of a method for transmitting a command from a first processing unit to a second processing unit, in accordance with one embodiment.

A queue manager is disclosed for managing the flow of data in multiprocessor systems that implement data processing pipelines. A data processing pipeline includes a sequence of data processing functions, each configured to perform specific operations in response to input commands and associated input data. The data processing functions may be implemented as fixed-function hardware circuits that are specifically designed to perform a given data processing function, or the data processing functions may be implemented as programming instructions executed by programmable hardware circuits. In some embodiments, a given category of data processing function (e.g., rasterization, texture mapping, etc.) may be performed by fixed-function hardware circuits or by programmable hardware circuits, depending on application requirements. A multiprocessor system may include a mix of both fixed-function hardware circuits and programmable hardware circuits configured to form a data processing pipeline, with commands and data passed through queues that reside in memory, such as local cache memory, locally attached memory, system memory, or a combination thereof. A command may include information necessary to perform a fixed-function operation, a programmable variation of a fixed-function operation, an application-specific shader program (thread program), a barrier operation, and the like. A command may include a direct or indirect reference to a shader program and launch/instantiation details for the shader program.

In general, these queues are structured as circular queues, so that data is pushed on one end of the circular queue and popped at the other end, with memory addresses wrapping around to form a conceptual circle. A given circular queue may be allocated a certain amount of memory initially, with head and tail pointers indicating where data should be pushed and where data should be popped. Using a circular queue to implement a queue can eliminate memory management operations that can interfere with efficient, real-time queue operation. A circular queue will overflow if a potential push would cause the head and tail pointers to cross, which would result in data corruption. The queue manager avoids overflows by explicitly accepting or rejecting push requests. The queue manager provides push pending zones for inbound data being written and pop pending zones within each queue for outbound data being read. Processing units are allowed to access push pending zones while performing a push operation and pop pending zones while performing a pop operation.

In one embodiment, a queue, as referred to herein, includes metadata, a command queue (e.g., a circular command queue), and a data queue (e.g., a circular data queue). The data queue is configured to store data that may be associated with one or more commands residing within the command queue. Certain commands may include associated data to be pushed into the data queue, while certain other commands may not include associated data to be pushed into the data queue. A given command stream residing within the command queue may include a mix of commands that both include associated data (pushed into data queue) and commands that do not (no associated data pushed into data queue). In one embodiment, the queue manager is configured to push commands onto the command queue and pop commands from the command queue. The queue manager may also be configured to push data associated with a given command onto the data queue and pop the data from the data queue. Alternatively, the queue manager may be configured to maintain pointers associated with pushing data onto the data queue and popping data from the data queue, while one or more client units perform corresponding write and read operations to data queue memory. The queue manager is further configured to manage implementation-specific data and metadata in support of managing the command queue and the data queue. In one embodiment, the metadata includes, without limitation, a queue identifier (queue ID), a queue base address for the command queue, a queue base address for the data queue, a queue size for each of the command queue and the data queue, queue push pointers (addresses, relative to queue base address or absolute), and queue pop pointers (addresses, relative to queue base address or absolute). The push pointers and pop pointers can include, without limitation, head pointers, tail pointers, extended head (xhead) pointers and extended tail (xtail) pointers, discussed in greater detail herein. Furthermore, metadata can also include full flags, configured to indicate that a particular queue is full. A ready body of a given queue is defined herein as a queue region between a head pointer and a tail pointer. A pop pending zone of a given queue is defined herein as a queue region between a head pointer and an xhead pointer. A push pending zone is defined herein as a queue region between a tail pointer and an xtail pointer. The metadata may also include a lookup table (LUT) that provides for indirection between incoming commands and associated actions for the commands. Furthermore, the metadata may include a drain that informs the queue manager where a given queue should be preferentially popped, along with scheduling priority, and state for an in-order ticketing system.

In one embodiment, the queue manager is configured to split inbound commands into a command queue for storing the command and a payload (additional command information), and a data queue for storing data associated with the command. When the queue manager receives a request to push a command from a source processing unit, the queue manager assesses whether there is presently enough space in both the command queue (to store command and payload) and the data queue (to store data for the command). If there is enough space in both the command and data queues to accept the command, then the push request is granted and the queue manager atomically pushes the command onto the command queue. Furthermore, the source processing unit is given access to a specified portion of memory in the push pending zone of the corresponding data queue. The source processing unit then sends the data for the command into a push pending zone of the data queue and informs the queue manager when writing the data for the command is complete. In response, the queue manager may update tail pointers to update and close the push pending zone. If there is not enough space in both the command queue and the data queue, the queue manager declines the push request, causing the source processing unit to retry the push request.

Each command may have a specified width. In the context of the present disclosure, a width refers to a number of items (e.g. indivisible commands and/or data objects) embedded within a given command. For example, a command that refers to one pixel (i.e., a color sample) has a width of one, while a different command that refers to four pixels has a width of four. Bit fields within a command may be constructed to compactly represent multiple commands, but each of the multiple commands may be extracted as a scalar command. In this context, a scalar command has a width of one. In the present disclosure, a command having a given width is indicated as command[ ] (with brackets). In general, a command may have a width greater than one unless the command is indicated to be a scalar command (width of one). To push an inbound command[ ] having an arbitrary width onto the command queue, the queue manager constructs a sequence of one or more corresponding scalar commands that are atomically pushed onto the command queue, the corresponding scalar commands fully specifying the overall function of the inbound command[ ]. A given inbound command[ ] may require a specific execution order for multiple constituent embedded commands. In one embodiment, execution order of the embedded commands is preserved in corresponding scalar commands that are pushed onto the command queue. For example, if an inbound command[ ] includes four constituent embedded commands that require a specific execution order, then the queue manager pushes four corresponding scalar commands onto the command queue in sequence to preserve the execution order. In other embodiments, a particular inbound command[ ] may not require a specific execution order and corresponding scalar commands are not required to preserve execution order.

The width of an inbound command[ ] (being pushed) may have a native width for the source processing unit, while the width of an outbound command[ ] (being popped) to be sent to a target processing unit may have a second width, such as a native width of the target processing unit. The queue manager constructs the outbound command[ ] to include one or more scalar commands from the command queue. In one embodiment, the outbound command[ ] is constructed by the queue manager to have a width that is up to, but not more than the second width. The number of scalar commands included in the outbound command is determined by a number of related, sequential, scalar commands at the head of the command queue when the outbound command[ ] is constructed. In one embodiment, the outbound command[ ] is constructed to preserve execution order of scalar commands in the command queue. For example, if a target processing unit has a width of four, then the queue manager pops up to four scalar commands from the command queue and constructs an outbound command[ ] to implicitly or explicitly indicate execution order for the four scalar commands embedded within the outbound command[ ]. In one embodiment, each scalar command has internal bit fields that determine whether the scalar command may be combined with other scalar commands to construct a single non-scalar outbound command[ ]. In general, scalar commands with the same internal bit fields can be combined to form a non-scalar outbound command[ ].

By scalarizing an inbound command[ ] to be queued and constructing an outbound command[ ] according to the native width of the target processing unit, the queue manager advantageously improves overall system efficiency and programmability. Additionally, by queuing an inbound command[ ] into a separate command queue and data queue, the command queue may be small enough to be substantially cached locally for the queue manager, allowing for efficient examination of commands. By contrast, a single queue for both commands and related data would dispose large spans of related data between the commands. The long spans would be difficult to cache in practical systems and the long spans would need to be traversed to retrieve sequential commands.

In certain embodiments, a command includes a "keep bit" that directs the queue manager to keep the command at the head of the command queue after an otherwise nominal pop operation. In some optional embodiments, the command is only removable when a processing unit (e.g., a target processing unit) explicitly directs the queue manager to mark the command in the command queue as removable. The keep bit allows the queue manager to efficiently perform certain iterative operations while maintaining pipeline state. Queue pointers may be pushed onto a stack to allow for iterative execution of "keep bit" commands.

An exemplary scalar command may comprise two bytes to specify the command, plus an optional payload having a size of a multiple of two bytes. In one embodiment, an overall command size may be restricted to a power of two number of bytes (2 B, 4 B, 8 B, 16 B, etc . . . ). In one embodiment, a given two byte command may internally comprise a set of bits that include, without limitation, one keep bit, two bits that specify a command size, three bits that specify a command type, three bits that specify a command, and seven bits that specify a data count associated with the command, which might be scaled by queue metadata to calculate a final size. A command type can include THREAD, QUADTHREAD, WARP (native width of unit), and CTA (arbitrary sized thread block). Note that a command[ ] pop operation might require that all scalar commands assembled together have identical command bits. During operation, a pop command[ ] would be cut at the lesser of either a native destination unit width or a sequence of identical command fields.

The queue manager may internally serialize any command[ ] that refers to more than one queue ID. To serialize, the queue manager would replay the source command, each time processing one unique queue ID, until all queue IDs have been processed.

In one embodiment, only the queue manager or a designated agent of the queue manager is configured to push commands onto a command queue (and corresponding data queue) and to schedule and pop commands from the command queue. Such push and pop operations are done atomically at an appropriate command width. Furthermore, any circuit module configured to communicate with the queue manager may request a push operation.

In certain embodiments, the queue manager is configured to manage a plurality of command queues and associated data queues. In such embodiments, the queue manager may select commands to pop from one of the command queues and direct popped commands to work scheduling units. The queue manager may use cached command data, as well as cached queue metadata to select which command or commands to pop at any given time. Further details regarding the operation of the queue manager are provided herein.

FIG. 1A illustrates a flowchart of a method 100 for transmitting a command[ ] from a first (source) processing unit to a second (target) processing unit, in accordance with one embodiment. Although the method 100 is described in conjunction with the systems of FIGS. 2-7B, any system that implements method 100 is within the scope and spirit of embodiments of the present disclosure. For example, in one embodiment, method 100 is performed by a queue manager comprising circuitry within a graphics processing unit. More generally, any multi-processing unit may include a queue manager comprising circuitry configured to perform method 100.

At step 102, the queue manager receives an inbound command[ ] of a first width from a first processing unit. The inbound command[ ] may be received as a push request. The first width may define a native command processing width for the first processor. In one embodiment, the inbound command[ ] is received through a dedicated hardware channel linking the first processing unit to the queue manager, and the inbound command[ ] includes a queue ID.

A given inbound command[ ] may have an arbitrary amount of associated data, specified in the inbound command[ ]. The amount of associated data may be specified in a bit field of the inbound command[ ]. The queue manager determines whether sufficient queue memory space is available to store the inbound command[ ] and associated data based on the amount of associated data and the size of the inbound command[ ]. In one embodiment, sufficient space may need to be available in both a command queue and a data queue for the inbound command[ ] to be accepted.

If, at step 103, the command[ ] can be accepted, method 100 proceeds to step 110, where the queue manager converts the inbound command[ ] into scalar format commands. For example, if the inbound command[ ] has a width of two, then the queue manager converts the inbound command[ ] into a first scalar command and a second scalar command. At step 112, the queue manager atomically stores the scalar format commands in at least one command queue.

At step 114, the queue manager sends one or more pointers to the first processing unit for storing data in at least one data queue. In one embodiment, the pointers reference regions within a push pending zone behind the tail of the data queue. At this point in method 100, the first processing unit may access memory referenced by the pointers and write data associated with the inbound command[ ] to the data queue. In one embodiment, after writing the data associated with the inbound command[ ], the first processing unit informs the queue manager that writing data for the inbound command[ ] has completed. The queue manager may then close the push pending zone and make the scalar format commands from the inbound command and associated data available to be popped (when at the head of the command queue) and transmitted to the second processing unit.

At step 116, the queue manager converts one or more scalar format commands into an outbound command[ ] of a second width. This step may be performed in conjunction with a pop operation for transmitting a command at the head of the command queue to the second processing unit. The queue manager pops and packs as many scalar format commands as can be fit according to packing rules (e.g. same command fields) into an outbound command[ ] having a size of the second width.

In one example, the inbound command[ ] may have a width of four but the second processing unit has a maximum command[ ] width of eight; in such a scenario, the queue manager may pack the equivalent of two inbound commands[ ] into one outbound command[ ]. In a variation of the above example, the second processing unit has a command width of one and the queue manager may pop and send four outbound commands[ ] to the second processing unit for each inbound command[ ]. In one embodiment, an outbound command[ ] does not need to respect the inbound command[ ] boundaries.

At step 118, the queue manager sends the outbound command[ ] to the second processing unit. Upon receiving the outbound command[ ], the second processing unit may proceed to read data associated with the outbound command[ ] from the data queue. The second processing unit reads the data in accordance with one or more pointers provided by the queue manager to the second processing unit. The one or more pointers reference data stored in the pop pending zone. The second processing unit informs the queue manager upon reading all necessary data associated with the outbound command[ ]. In one embodiment, the queue manager then updates the data queue head to free queue space associated with the pop pending zone.

Returning to step 103, if the command[ ] cannot be accepted, method 100 proceeds to step 104, where the queue manager declines the push request from the first processing unit.

Figure 1B:
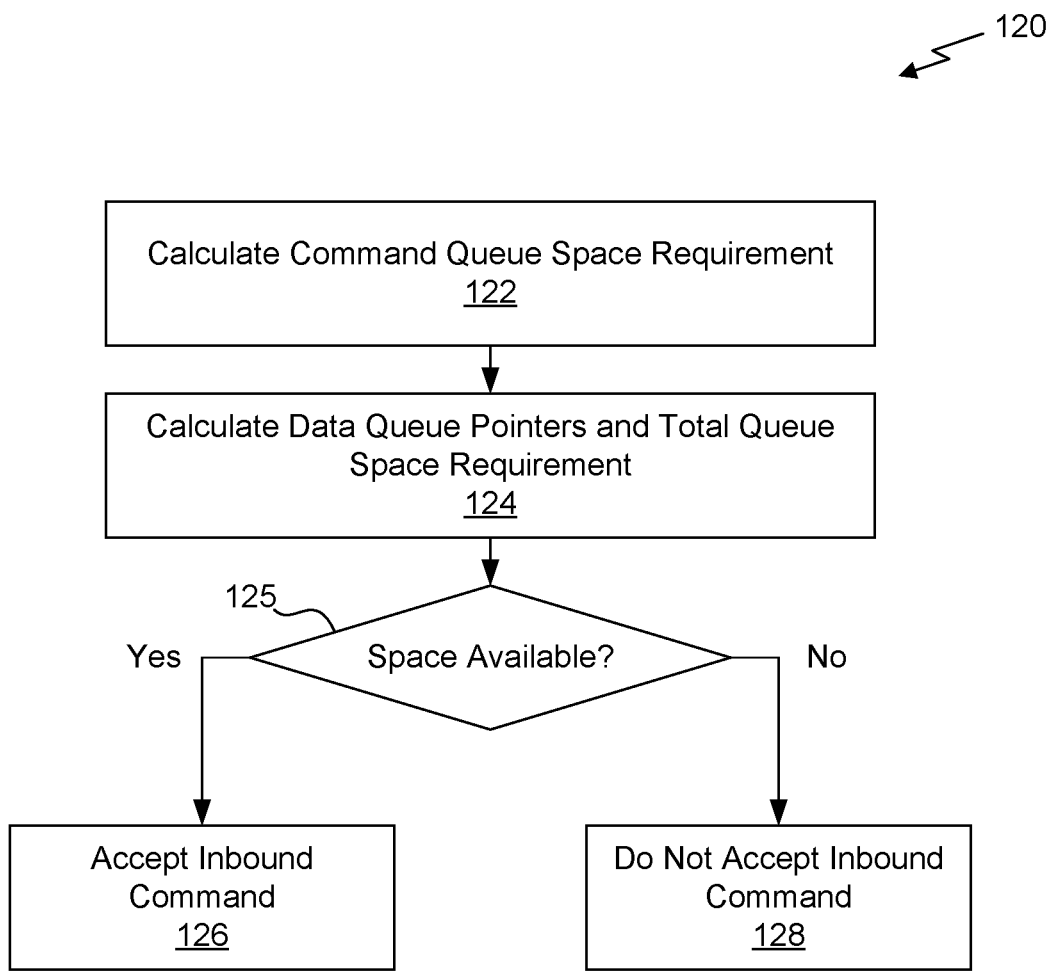
FIG. 1B illustrates a flowchart of a method for determining whether to accept a command, in accordance with one embodiment.

FIG. 1B illustrates a flowchart of a method 120 for determining whether to accept an inbound command[ ], in accordance with one embodiment. Although the method 120 is described in conjunction with the systems of FIGS. 2-7B, any system that implements method 120 is within the scope and spirit of embodiments of the present disclosure. For example, in one embodiment, method 120 is performed by a queue manager comprising circuitry within a graphics processing unit. More generally, any multi-processing unit may include a queue manager comprising circuitry configured to perform method 120. In one embodiment, step 103 of method 100 may be implemented as method 120.

At step 122 the queue manager calculates a command queue space requirement for in inbound command[ ]. In one embodiment, the inbound command[ ] includes at least one bit field that specifies the size of the inbound command[ ]. The amount of free space in the command queue may be indicated by command queue metadata, which may be cached and/or maintained within the queue manager. If the size of the inbound command[ ] is less than the free space in the command queue, then the queue manager determines that there is enough space in the command queue.

At step 124 the queue manager calculates a data queue space requirement for the inbound command[ ]. In one embodiment, the size of data for the inbound command[ ] is indicated by at least one bit field of the inbound command[ ]. The amount of free space in the data queue is indicated by data queue metadata, which may be cached and/or maintained within the queue manager. If the size of data for the inbound command[ ] is less than the free space in the data queue, then the queue manager determines that there is enough space in the data queue.

If, at step 125 the queue manager has determined that there is enough space in the command queue and that there is enough space in the data queue, then the method 120 proceeds to step 126, where the inbound command[ ] is accepted. Otherwise, the method 120 proceeds to step 128, where the command[ ] is not accepted.

Figure 1C:
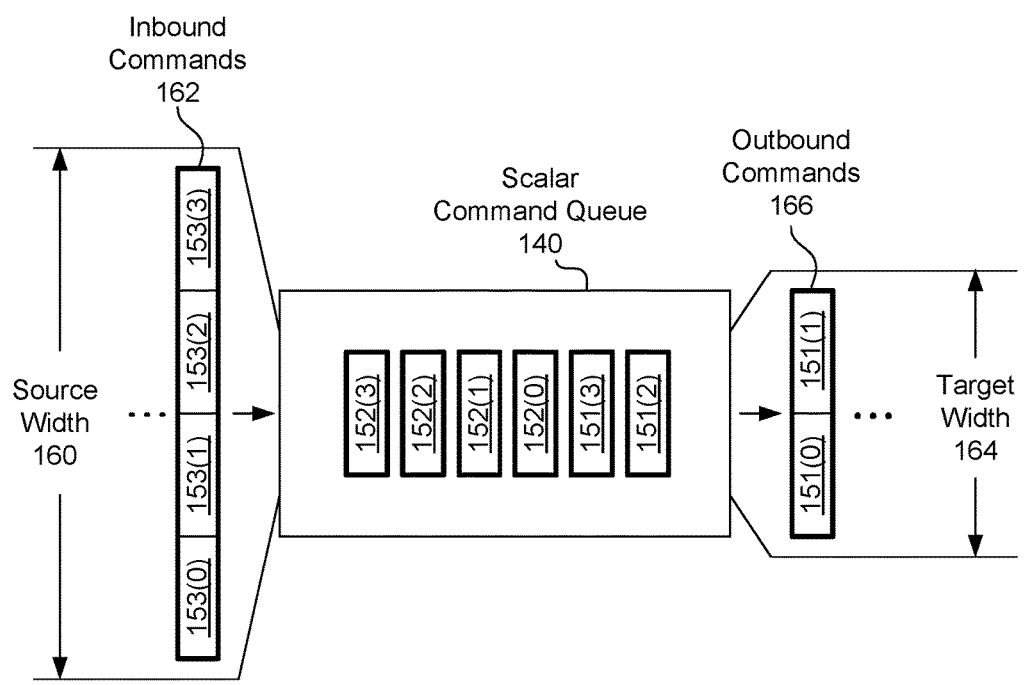
FIG. 1C is a conceptual diagram of a scalar command queue with different input and output command widths, in accordance with one embodiment.

FIG. 1C is a conceptual diagram of a scalar command queue 140 with different input and output command[ ] widths, in accordance with one embodiment. Inbound commands[ ] 162 received from a source (first) processing unit have a source (first) width 160 and outbound commands[ ] 166 sent to a target (second) processing unit have a target (second) width 164. As shown in the present example, the source width 160 is four and an inbound command[ ] comprises an equivalent of four scalar format commands 153(0)-153(3). Inbound commands[ ] are pushed into the scalar command queue 140 as individual scalar format commands. As shown, scalar format commands 152(0)-152(3), along with scalar format commands 151(2)-151(3) are present in the scalar command queue 140. Furthermore, scalar format commands 151(0) and 151(1) have been popped and are in flight to the target processing unit, packaged together as an outbound command[ ] having a target width 164 of two. In this example, scalar commands 151(0)-151(3) were generated by the source processing unit as a single command[ ] having a width of four, were pushed into scalar command queue 140 as scalar format commands 151, and were popped to generate an outbound command[ ] having a width of two.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
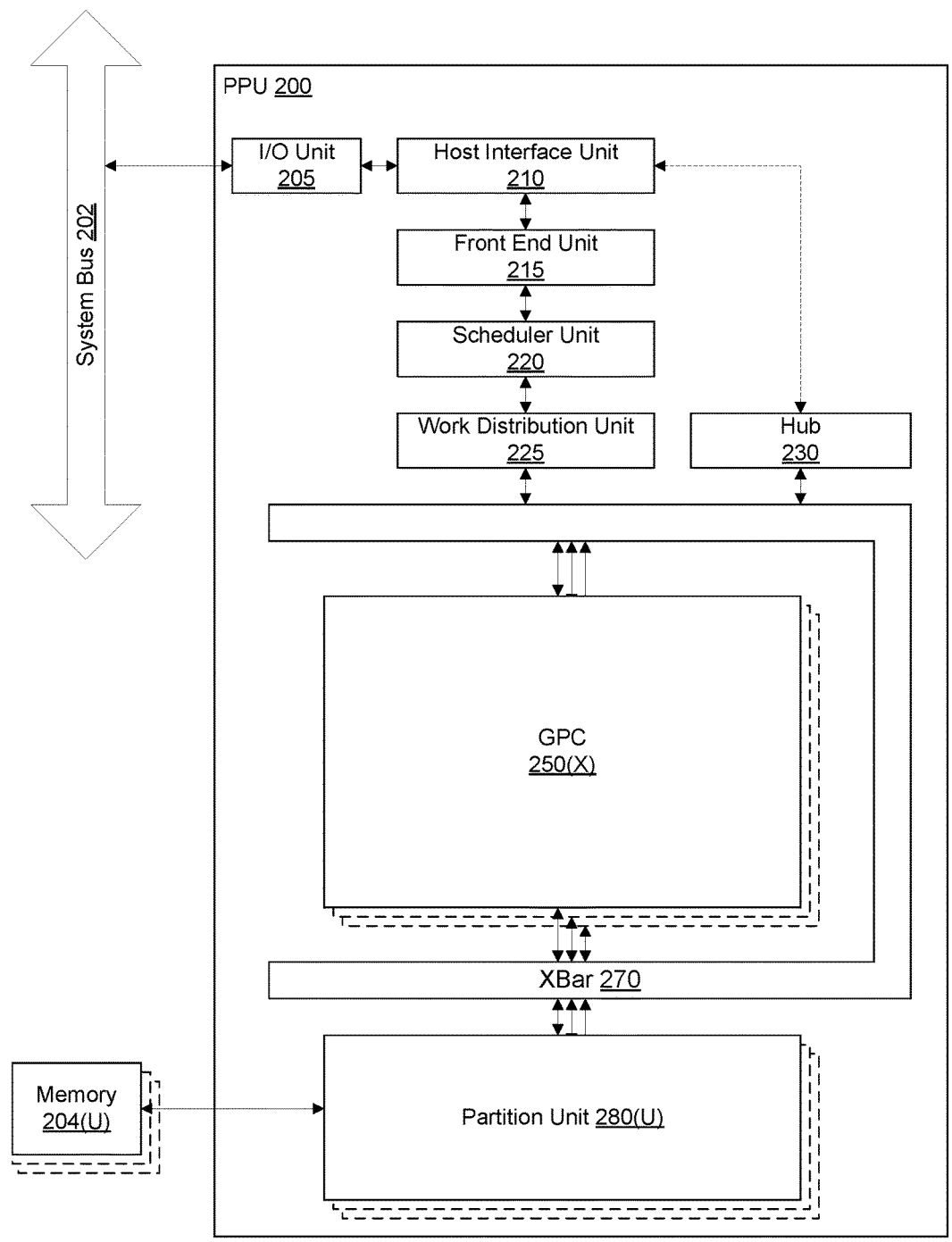
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In other embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads. Each thread within a given warp may be assigned a different thread index (e.g., a unique thread ID). Furthermore, each thread within the warp may be assigned a specific position within a temporal order (relative execution order). In one embodiment, the temporal order is assigned according to increasing thread index values, so that a thread with a lower index value executes before a thread with a higher index value. In another embodiment, the temporal order is assigned according to decreasing thread index values, so that a thread with a higher index value executes before a thread with a lower index value. In certain embodiments, threads are scheduled and pushed into a command queue for execution according to temporal order for the threads. The warp, and threads specified therein, may also have an assigned temporal order with respect to other warps.

Figure 3A:
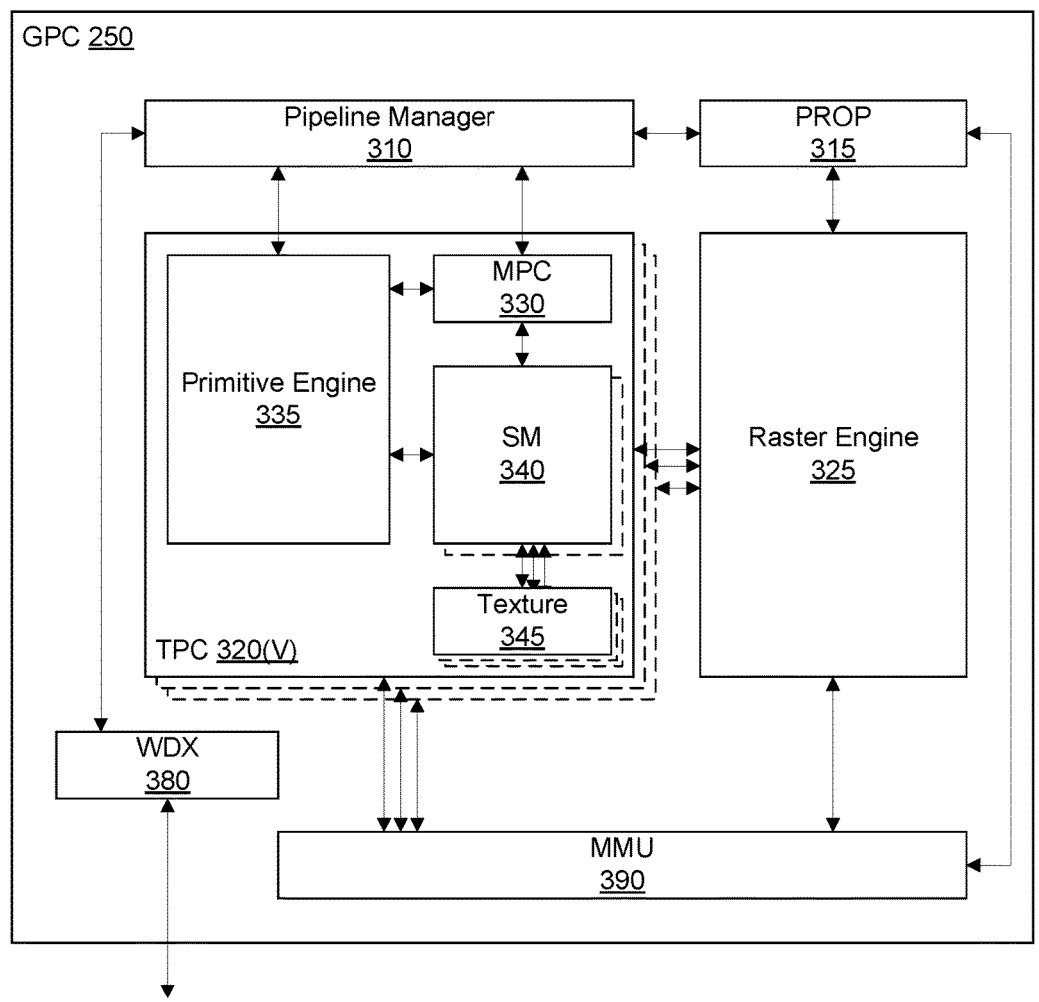
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a raster operations pipeline in the form of a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture modules in the form of texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
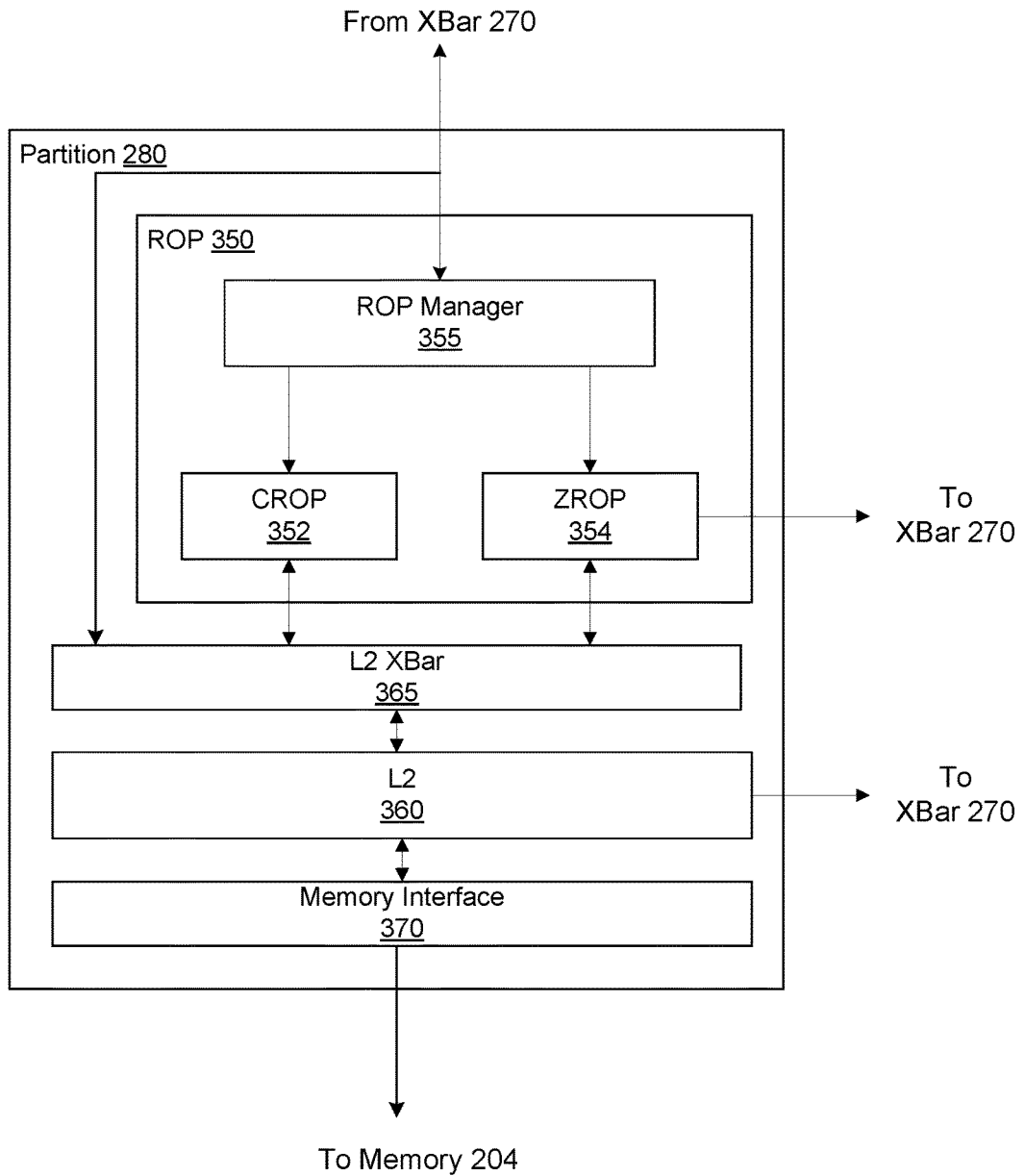
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
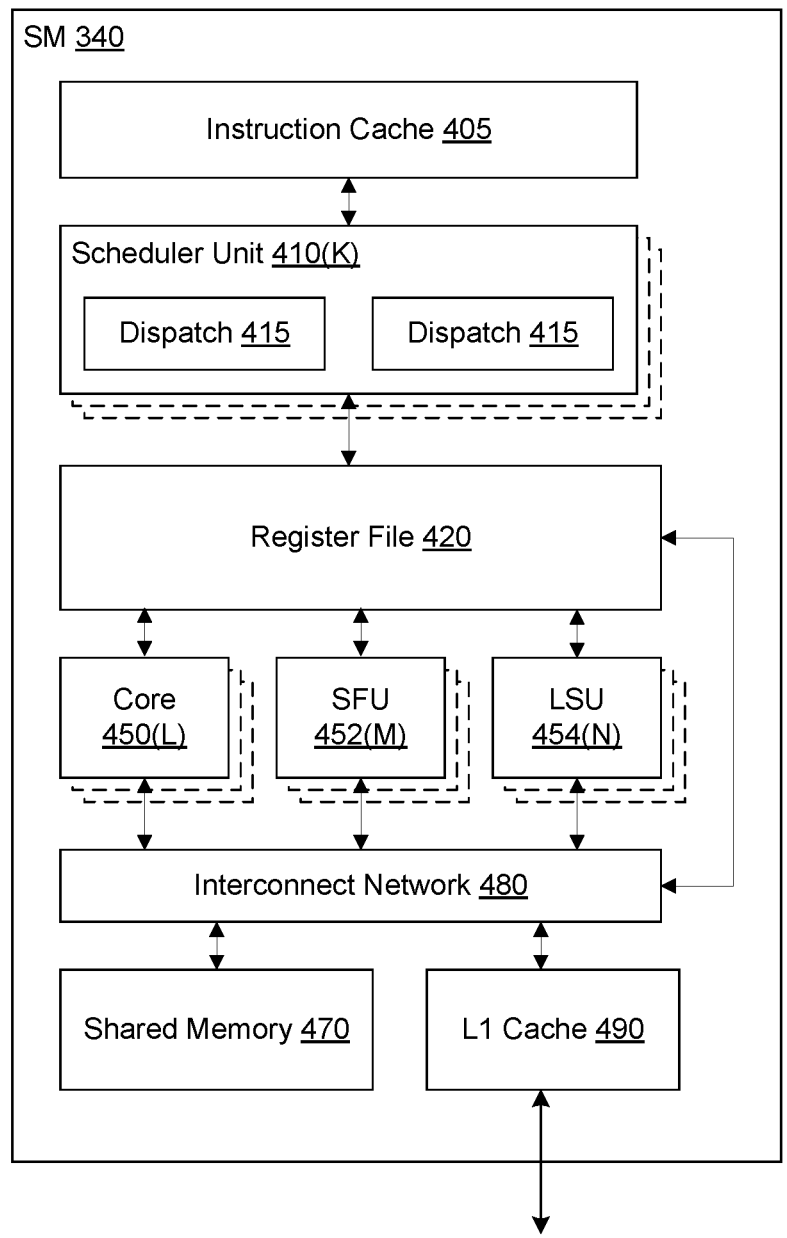
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In other embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
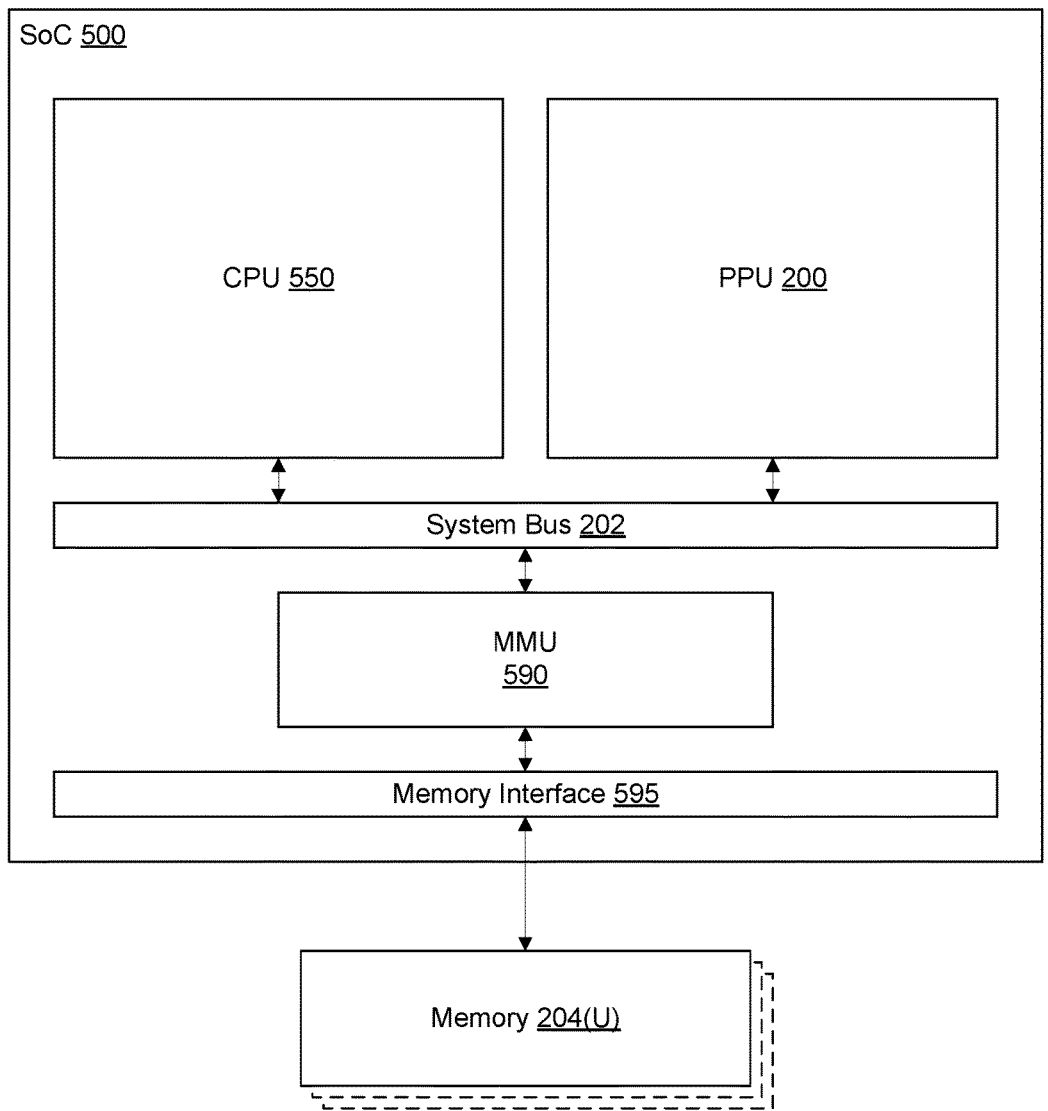
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
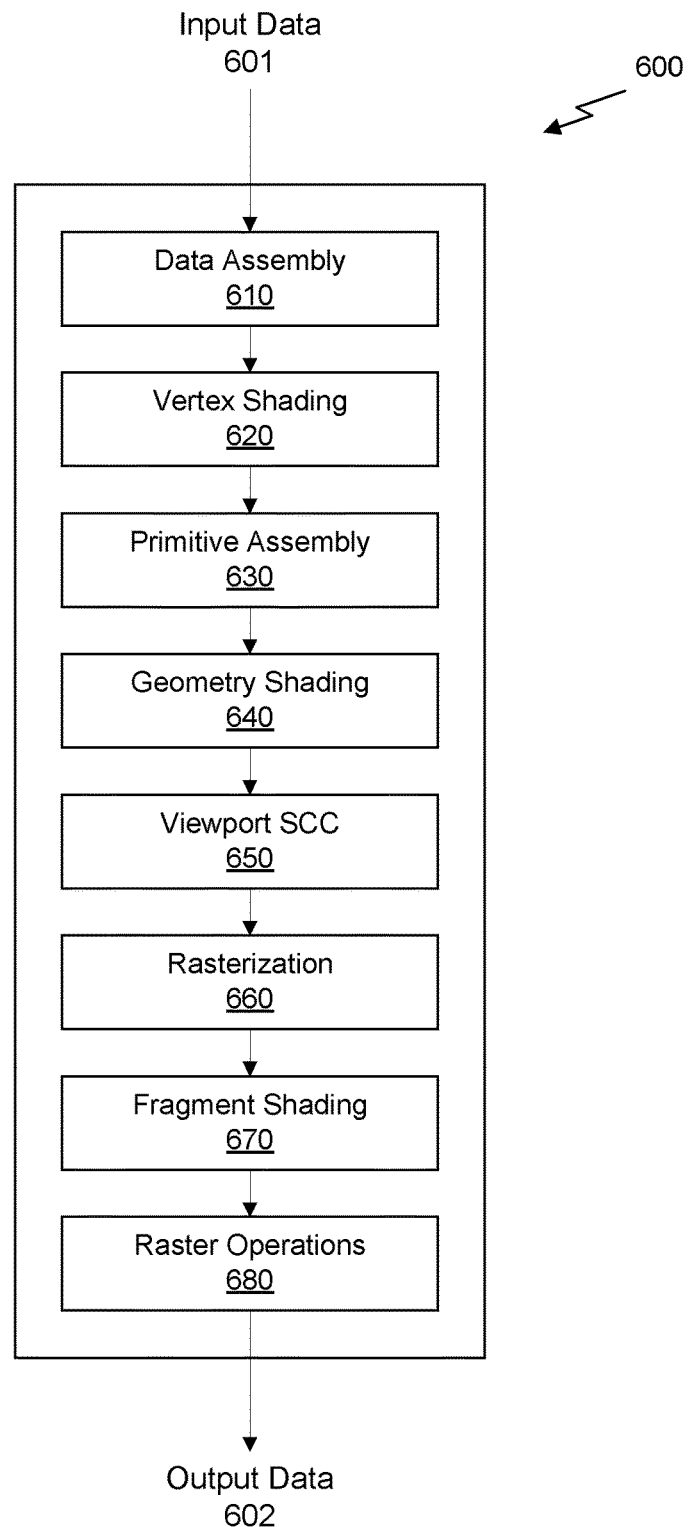
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Queue Manager

Figure 7A:
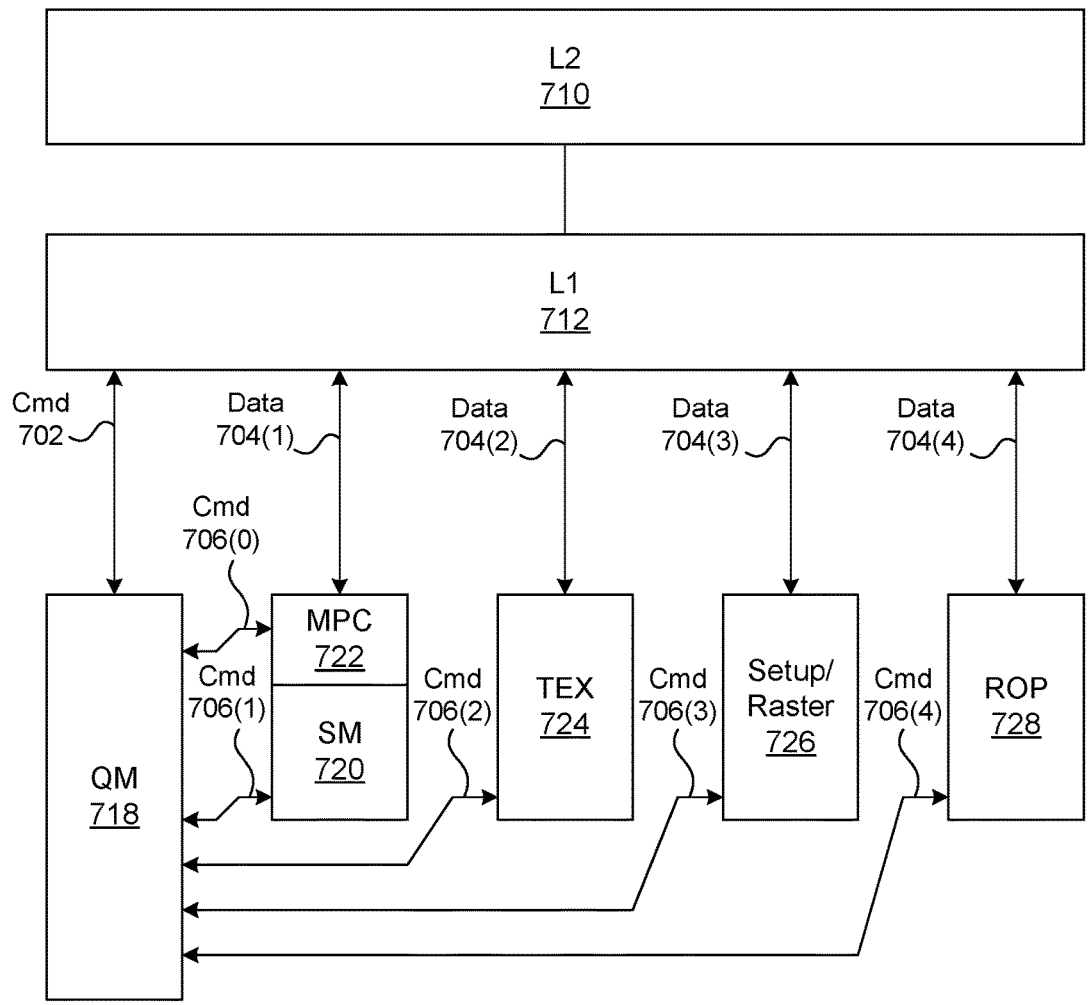
FIG. 7A illustrates a queue manager in communication with different processing units within a parallel processing unit, in accordance with one embodiment.

FIG. 7A illustrates a queue manager (QM) 718 in communication with different processing units within a parallel processing unit (e.g., PPU 200 of FIG. 2), in accordance with one embodiment. The QM 718 may be implemented as dedicated logic circuits configured to perform methods 100 and 120, or as a micro-coded processing unit configured to execute programming instructions to perform methods 100 and 120. The programming instructions are stored in non-transitory computer readable medium such as read-only memory, flash memory, random access memory, or a combination thereof.

As shown, the QM 718 is coupled to a level one (L1) cache 712, which is coupled to a level two (L2) cache 710. The L1 cache 712 is accessible to queue manager 718, an MPC 722, a texture (TEX) units 724, a setup/raster unit 726, and a raster operations (ROP) unit 728. The QM 718 is configured to manage one or more command queues and corresponding data queues within one or more memory spaces mapped into L1 712. Furthermore, QM 718 is configured to push commands[ ] to and pop commands[ ] from the one or more command queues on behalf of client units comprising MPC 722, SM 720, TEX 724, setup/raster unit 726, ROP 728, and/or possibly other unillustrated units.

As further shown, QM 718 reads and writes command information (Cmd 702) to L1 712. The command information is read from command queues and written to command queues stored in L1 712, L2 710, and further memory systems coupled to L2 710. As shown, command (Cmd) interconnects 706 directly link QM 718 to client units, allowing the client units to request that QM 718 pushes commands[ ] on their behalf, and further allows QM 718 to pop commands[ ] to the client units. In one optional embodiment, all push operations to a command queue and all pop operations from the command queue are performed by the QM 718.

By contrast, data 704 in a data queue may be accessed in memory by a client unit. In one embodiment, accesses requests to data 704 are passed through QM 718, which provides address verification for each access request (e.g., a request address points to an open, valid entry in the data queue). In another embodiment, access requests to data 704 are made directly to L1 712, without address verification by QM 718.

In one embodiment, the L2 cache 710 is implemented as at least a portion of L2 cache 360 of FIG. 3B. In certain embodiments, L1 cache 712 is implemented as at least a portion of L1 cache 490 of FIG. 4. In one embodiment, MPC 722 comprises M-Pipe Controller (MPC) 330 of FIG. 3A, SM 720 comprises SM 340, texture unit 724 comprises texture unit 345, and raster operations unit 728 comprises raster engine 325 and/or pre-raster operations unit (PROP) 315. In one embodiment, SM 720 is configured to execute a warp command, comprising a set of individual threads. Each thread within the warp performs programming instructions which cause the thread to generate a resulting command. The resulting command may include resulting data, some or all of which may be written to L1 712 as data 704(1). Resulting commands from the set of individual threads are transmitted through command interconnect 706(1) to QM 718, which enqueues the commands into an appropriate command queue (e.g., coupled to a subsequent processing unit). For example, SM 720 may execute a warp command that launches four individual threads, and each of the individual threads generates a resulting command. In this example, four resulting commands are generated from the warp executing. The four resulting commands are transmitted to QM 718, which enqueues the four resulting commands as individual scalar format commands into the appropriate command queue. A subsequent processing unit may request QM 718 to dequeue one or more of the resulting commands at a time for processing.

Figure 7B:
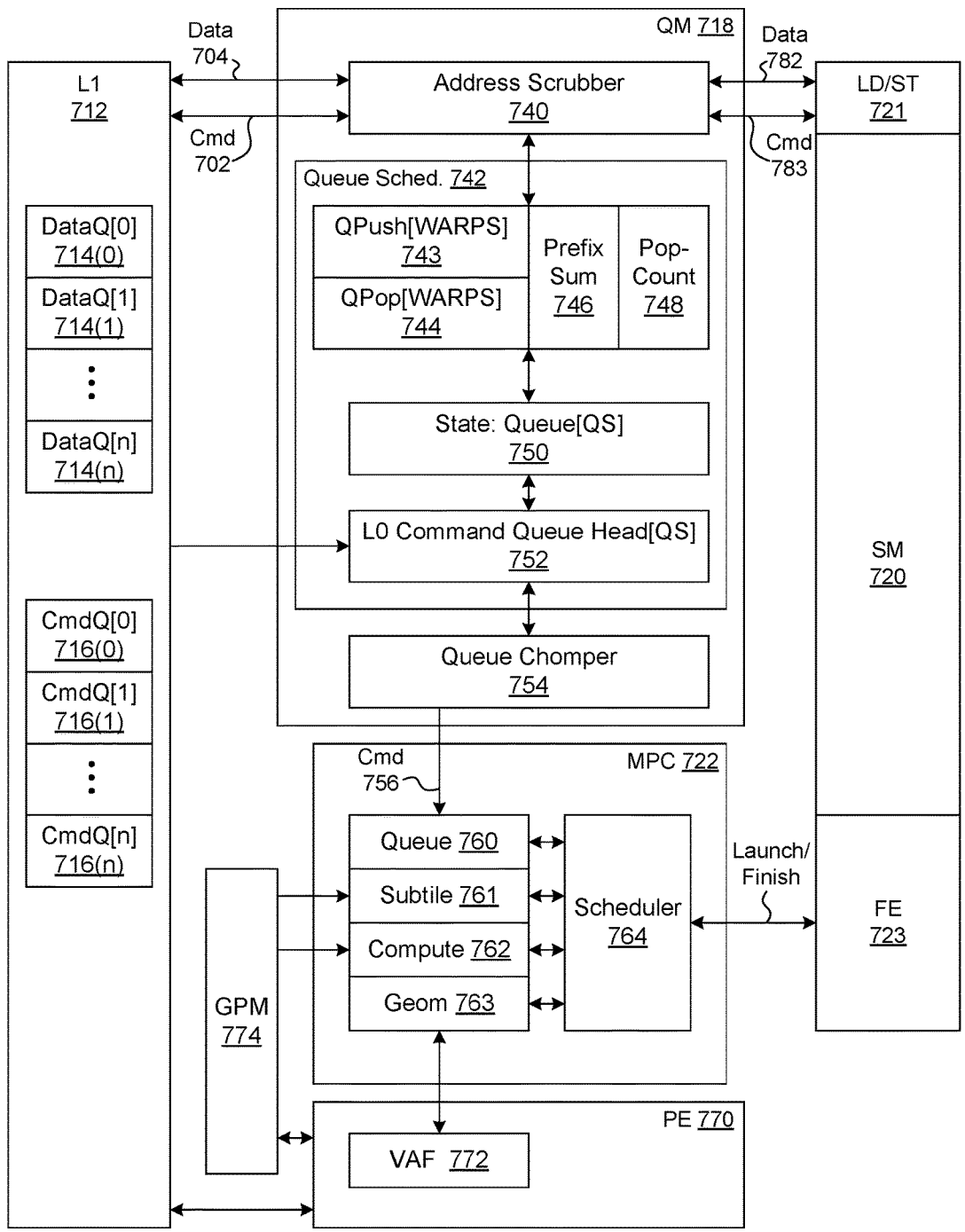
FIG. 7B illustrate a queue manager within a parallel processing unit, in accordance with one embodiment.

FIG. 7B illustrate QM 718 within a parallel processing unit (e.g., PPU 200 of FIG. 2), in accordance with one embodiment. In one embodiment, an instance of QM 718 is implemented within corresponding instances of TPC 320 shown in FIG. 3A. In other embodiments, QM 718 may be implemented in one or more different portions of various multiprocessor system architectures. As shown, QM 718 is configured to communicate with L1 712, SM 720, and MPC 722. In this context, QM 718 manages command queues through which the SM 720 and MPC 722 communicate commands. In other embodiments, QM 718 may be configured to communicate with different or additional hardware subsystems (client units).

In one embodiment, QM 718 is configured to manage one or more command queues, such as command queue 0 (CmdQ[0]) 716(0), command queue 1 (CmdQ[1]) 716(1), and so forth residing within memory ranges mapped into L1 712. One or more of command queues 716 may be implemented as a circular queue, as described herein. An arbitrary number of command queues 716 may be managed by QM 718 in accordance with the present disclosure. QM 718 also manages one or more data queues, such as data queue 0 (DataQ[0]) 714(0), data queue 1 (DataQ[1]) 714(1), and so forth. Each data queue 714 is paired with a command queue 716.

QM 718 performs, without limitation, push operations to push commands[ ] onto one or more command queues 716 and pop operations to pop commands[ ] off of one or more command queues 716. An inbound command[ ] directed to QM 718 may be pushed onto a selected command queue 716 if there is space on both the selected command queue 716 and a paired data queue (DataQ) 714.

A load/store (LD/ST) unit 721 is configured to load data 782 associated with commands from one or more data queues 714 into SM 720 and store data 782 from SM 720 within one or more data queues 714. Such data may include, without limitation, execution state associated with threads, WARPS, and co-operative thread arrays (CTAs) executing on or queued for execution on SM 720. Furthermore, LD/ST unit 721 may communicate (send to command queue, receive from command queue) commands 783 with QM 718. A front end (FE) unit 723 manages context and context switch operations for SM 720. In particular, FE 723 receives launch instructions and context for SM 720 from MPC 722, and generates a finish indication for MPC 722.

In one embodiment, QM 718 comprises an address scrubber 740, a queue scheduler 742, and a queue chomper circuit in the form of a queue chomper 754. Address scrubber 740 is configured to assess whether read/write memory access requests to an entry of a data queue 714 from client units (e.g., SM 720) are within a predefined memory address range. The memory address range may be defined as low and high addresses, a base address and an offset (circular queue structure), and so forth. For example, a write request to a particular entry of a selected data queue 714 is only assessed to be valid if an address range for the write request falls within an open push pending zone that is associated with the client making the write request. Similarly, a read request to a particular entry of a selected data queue 714 is only valid if an address range for the read request falls within an open pop pending zone that is associated with the client making the read request. In one embodiment, if an invalid address is detected by the address scrubber 740, the access request is denied. An association between a client and a data queue entry may be established using any technically feasible technique. For example, each data queue 714 may be explicitly associated with a particular client unit. One or more read address ranges and write address ranges may be maintained by QM 718 for each data queue 714, with address ranges stored in the QPush[ ] and QPop[ ] tables for each open push or pop. The address data in the QPush[ ] and QPop[ ] tables may also be used to update queue head and tail pointers when a push or pop is completed, even if the operations are out of order.

In one embodiment, queue scheduler 742 includes queue push (QPush) array 743, queue pop (QPop) array 744, a prefix-sum adder circuit in the form of a prefix-sum unit 746, a pop-count unit 748, a state queue metadata array 750, and a level zero (L0) command queue head cache 752. The command queue head cache 752 is configured to locally cache (within QM 718) command queue head entries for different command queue 716. In one embodiment, the command queue head cache 752 provides at least sixty-four bytes per command queue 716 for caching command queue head entries. The QPush[ ] and QPop[ ] arrays may contain a valid bit, a done bit (e.g., indicating that an entry is closed but related queue pointers have not yet advanced), a client identifier, an active mask (marking which scalar entries of the source command[ ] are active), and a valid address range for open command and data queues. An address range may be relative to the queue base address or the address range may be absolute.

In one embodiment, state queue metadata array 750 is configured to store and update queue metadata, such as a base pointer for each queue, head, extended head, tail and extended tail pointers per queue. The state queue metadata array 750 may update pointers for paired queues synchronously, such as to synchronously complete a push or pop operation for a paired command queue 716 and data queue 714.

A given inbound push command[ ] targeting a selected command queue 716 may include a number of constituent scalar format commands, each of which may be pushed individually into the selected command queue 716. Each scalar format command may require a corresponding data entry in a paired data queue 714. While data entries in the data queue 714 are written later, pointers to the data entries need to be generated efficiently and transmitted back to a unit that generated the inbound push command[ ]. In one embodiment, the prefix-sum unit 746 is configured to compute a set of memory address pointers that locate data entries within a data queue 714. The prefix-sum unit 746 computes accumulated sum values, starting with, for example, a tail pointer, and concluding with an ending address in memory for a proposed push operation. The ending address in memory may be used as an updated extended tail pointer if the inbound push command[ ] is accepted. The prefix-sum unit 746 may be configured to wrap an address space according to the construction of a circular queue. In various embodiments, client units are configured to be aware of and compute address wraparound for the circular queue. In other embodiments, addresses for data entries in the data queue 714 are selected to avoid a wraparound scenario, so that any one data entry in the data queue 714 only requires contiguous absolute addresses. The address scrubber 740 may also automatically wrap addresses. The ending address computed by the prefix-sum unit 746 may be used to determine whether a given queue has enough space to accept a push request. If, for example, the ending address does not pass an extended head pointer for the data queue 714, then there is enough space in the data queue 714 to accept the inbound push command[ ]. The prefix-sum unit 746 may be implemented as a multiple input adder logic circuit. The adder logic circuit may be structured as a parallel or serial chain. Furthermore, the adder logic circuit may include look-ahead logic.

A requested push command[ ] may comprise a number of internal scalar commands. Each scalar command has a valid bit, a command to be pushed, a command count of such commands, and a data count. In one embodiment, if a scalar command is valid, then its command size is equal to its command count left shifted by its command size bit field (e.g., assuming command size is equal to two raised to a power specified by an associated command size bit field), then multiplied by its command count. Prefix-sum unit 746 adds up the overall command[ ] size. An overall data size is similarly calculated. In one embodiment, if a scalar command is valid, then its data size is equal to its data count left shifted by the data queue metadata data size field, then multiplied by its command count. Note that left shifting is a simplified way to scale numbers, and may also be implemented as a multiply (e.g., each left shift corresponds to multiplying a binary number by two). Once overall requested command[ ] and data[ ] sizes are calculated, the sizes may be checked against available queue spaces to determine whether the commands[ ] (and associated data) will fit in specified queues. The prefix-sum unit 746 does these calculations and also calculates cumulative data offsets of each sequential scalar command, which may be used as data offsets into data queue spaces. In one embodiment, pop-count unit 748 is configured to assist prefix-sum unit 746 in performing calculations.

A scheduled outbound command[ ] includes similarly calculated data queue offsets based on the commands to be popped from a chosen command queue.

In one embodiment, queue chomper 754 is configured to assemble an outbound command[ ] 756 from a set of sequential scalar format commands residing in a selected command queue 716. The set of sequential scalar format commands are converted into an outbound command[ ] of a specified width. The specified width is determined by a native command width for a target unit selected to receive the outbound command and whether the scalar commands may be packed together. For example, if a target unit has a native width of one, then the queue chomper 754 will prepare outbound commands[ ] with a width of one (a single scalar format command). In another embodiment, if the target unit has a native width of eight, then queue chomper 754 will prepare outbound commands[ ] with a width of up to eight (eight aggregated scalar format commands). In this example, an outbound command[ ] with less than eight constituent commands may include a balance of null commands for syntactic compatibility with a command width of eight. Only compatible commands may be assembled in any one outbound command. In one embodiment, compatible commands are identical in size and function. The queue chomper 754 assembles only as many scalar format commands as are available in contiguous sequence in the selected command queue 716. A non-compatible command encountered by the queue chomper 754 is not included in a current outbound command, but is instead included in a subsequent outbound command.

In one embodiment, queue chomper 754 inspects a first command of a queue and extracts a size for the command. Queue chomper 754 then compares each subsequent command at a command size offset based on the size until either a packing limit is reached, a different command is found, the command queue runs out of commands, or an inspection size limit is reached. The top of the command queue is assumed to be cached in the L0 Command Queue Head 752, allowing efficient inspection of (for example) the first sixty-four bytes, allowing up to thirty-two commands at two bytes each. Note that command comparisons may be efficiently done in parallel. Once an outbound command[ ] is extracted, associated data queue offsets may be calculated by the prefix-sum unit 746.

In one embodiment, different command queues 716 are given different priorities, so that commands from a higher priority command queue 716 are given higher selection priority when queue scheduler 742 selects a command queue 716 to be popped into the queue chomper 754 to form a new outbound command. Any technically feasible priority assignment and enforcement policy may be implemented without departing the scope of the present disclosure. In certain embodiments, a strict priority is implemented. In other embodiments, anti-starvation priority techniques may be implemented along with priority assignment. Queues may also be blocked from pushing or popping via queue metadata flags. These flags may be set by a client unit.

The MPC 722 includes a scheduler 764, and different work queues 760-763. A subtle work queue 761 may be used to queue up fragment work (e.g., processing fragments to generate pixels), a compute queue 762 may be used to queue up general thread computing work, a geometry queue 763 may be used to queue up geometry work (e.g., processing geometry primitives). Queue manager queue 760 is used to queue up work managed by QM 718, and may target arbitrary processing units. The scheduler 764 selects work from the different work queues 760-763 and transmits the work to target processing units. The MPC 722 may receive and/or post work to the PE 770, for example through a vertex attribute fetch unit VAF 772. Furthermore, the MPC 722 may receive work from a graphics processor cluster (GPC manager) unit 774.

In one embodiment, SM 340 of FIG. 3A includes SM 720, MPC 330 includes MPC 722, primitive engine 335 includes PE 770. In various embodiments, an instance of QM 718 is included in or coupled to one or more instances of TPC 320.

Figure 8:
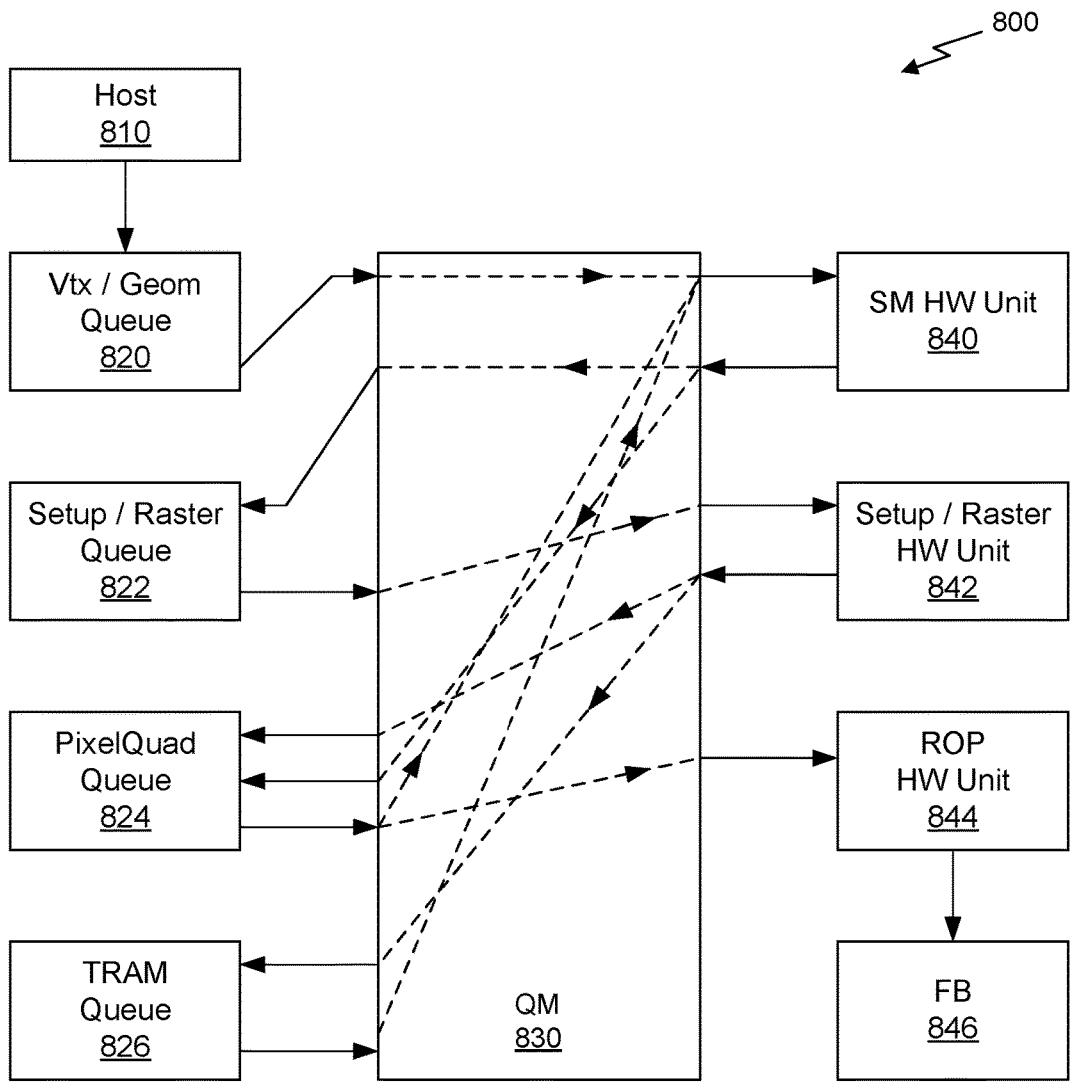
FIG. 8 is a conceptual diagram of an exemplary data flow within a processing pipeline, in accordance with one embodiment.

FIG. 8 is a conceptual diagram of an exemplary data flow within a processing pipeline 800, in accordance with one embodiment. In certain embodiments, QM 830 comprises QM 718 of FIG. 7B.

As shown, the processing pipeline 800 includes a host 810, a vertex/geometry (vtx/geom) queue 820, a setup/raster queue 822, a pixel quad queue 824, and a triangle random access memory (TRAM) queue 826, a queue manager (QM) 830, a streaming multiprocessor (SM) hardware (HW) unit 840, a setup/raster hardware unit 842, a raster operations (ROP) hardware unit 844, and a frame buffer (FB) 846.

In one embodiment, each of the vertex/geometry queue 820, setup/raster queue 822, pixel quad queue 824, and TRAM queue 826 is implemented as a command queue and data queue pair that is managed by the QM 830.

The host 810 generates a stream of work for the processing pipeline 800. For example, an application program executing on the host 810 may generate frames of graphics scene information to be rendered. The work is passed through vertex/geometry queue 820 to the SM HW unit 840 for vertex and geometry processing, which produces geometry primitives. In other words, SM HW unit 840 is configured to receive work in the form of commands popped from a first command queue by QM 830 (the graphics scene information) and generate work in the form of commands[ ] pushed onto a second command queue by QM 830 (the geometry primitives). The geometry primitives are passed through setup/raster queue 822 to setup/raster hardware unit 842, which produces fragments. The fragments are pushed onto the PixelQuad queue 824 with the keep bit enabled. In one embodiment, the fragments are then non-destructively popped for processing by the SM HW unit 840 for shading (e.g. texture mapping) and color interpolation using the triangle data in the TRAM queue. Fragment color is then written back into the PixelQuad Queue 824 and the command keep bit is cleared. Corresponding quads are then popped to the ROP HW unit 844 for compositing, depth sorting, and the like. The setup/raster hardware unit 842 passes parameters through the TRAM queue 826 to the SM HW unit 840 for certain operations, such as fragment shading and texture mapping. The ROP HW unit 844 transmits pixel data to the FB 846 for storage and/or display. In an alternative embodiment, rather than use a keep bit, QM 830 may be configured to push completed pixel quads onto another intermediate queue, which then could feed a ROP unit (e.g., ROP unit 350, ROP HW unit 844).

The QM 830 receives inbound commands[ ] of any valid width and stores an equivalent sequence of one or more scalar format commands. Each of the vertex/geometry queue 820, setup/raster queue 822, pixel quad queue 824, and TRAM queue 826 is configured to store scalar format commands and the QM 830 constructs scalar or wider outbound commands[ ], as appropriate to each of the SM HW unit 840, setup/raster hardware unit 842, and raster operations (ROP) hardware unit 844.

In one embodiment, the QM 830 is configured to manage queuing of data flow between different processing stages (e.g., data assembly 610 through raster operations 680) in graphics processing pipeline 600, discussed in conjunction with FIG. 6. Because inbound commands[ ] of a first arbitrary width are converted into scalar format commands, and the scalar format commands are converted into outbound commands[ ] of a second arbitrary width, QM 830 may dynamically redirect outbound commands[ ] from one target processing unit to another, different, target processing unit. For example, the SM HW unit 840 may be employed to rasterize certain primitives instead of the Setup/Raster hardware unit 842.

More generally, QM 830 may be configured to manage queuing of data flow through arbitrary multiprocessor pipeline architectures.

Figure 9A:
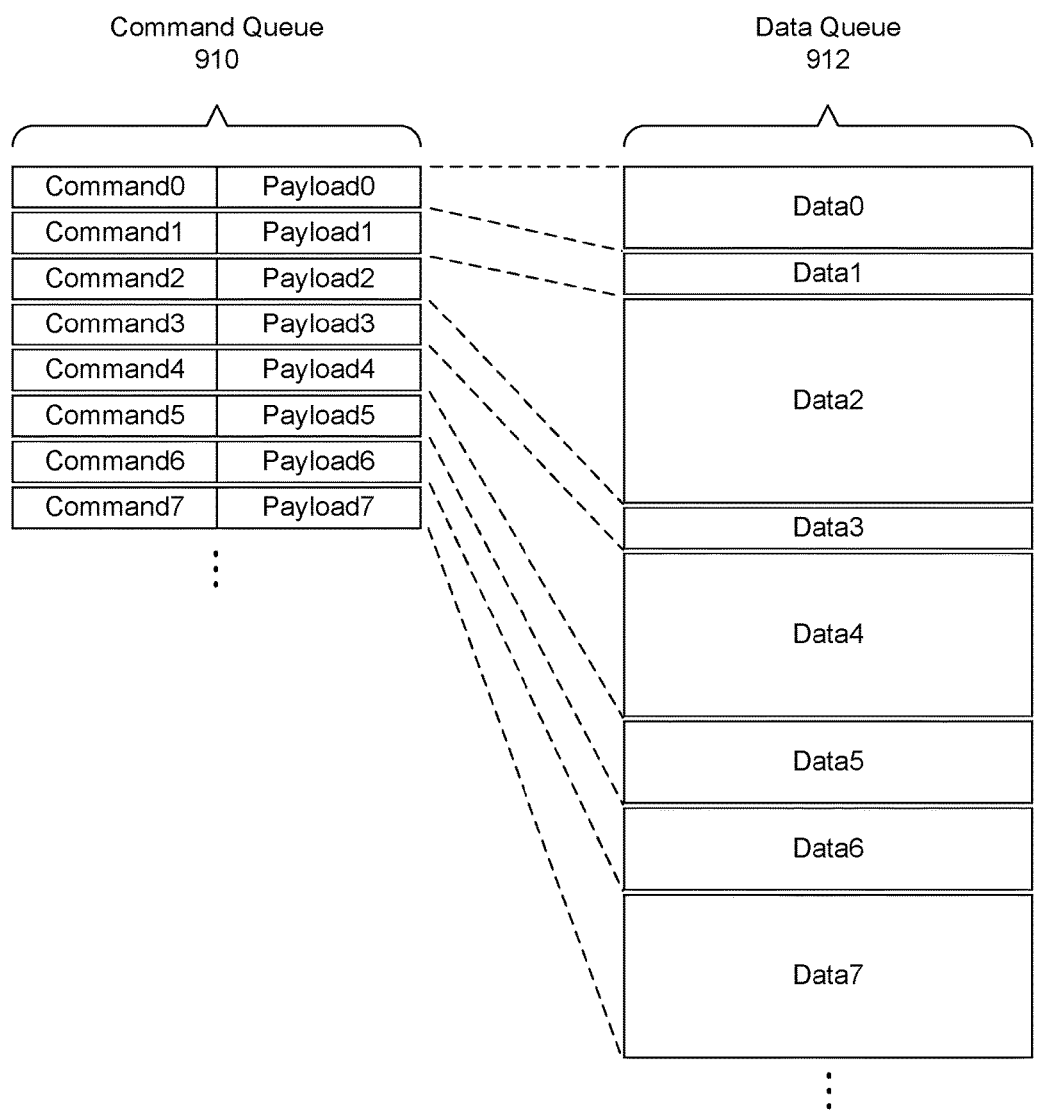
FIG. 9A illustrates pairing of command queue and data queue entries, in accordance with one embodiment.

FIG. 9A illustrates pairing of command queue and data queue entries, in accordance with one embodiment. As shown, a command queue 910 includes an ordered sequence of command packets, with each command packet comprising a command field and an optional payload field. Each command packet may be paired with a data entry in a data queue 912. For example, the command packet comprising Command2 and Payload2 is paired with Data2 in the data queue 912. An arbitrary amount of data in the data queue 912 may be associated with a given command in the command queue 910, limited only by available space in the data queue 912 and control space in the command/payload The command field in a command packet specifies an action or a barrier, while the payload field specifies information related to the action. In one example, the command field may specify execution of a shader, while the payload field may specify an index to identify the shader to be executed. In another example, the command field may specify that a cooperative thread array (CTA) should be spawned, and the payload field may specify dimensions for the CTA and other CTA setup data.

Figure 9B:
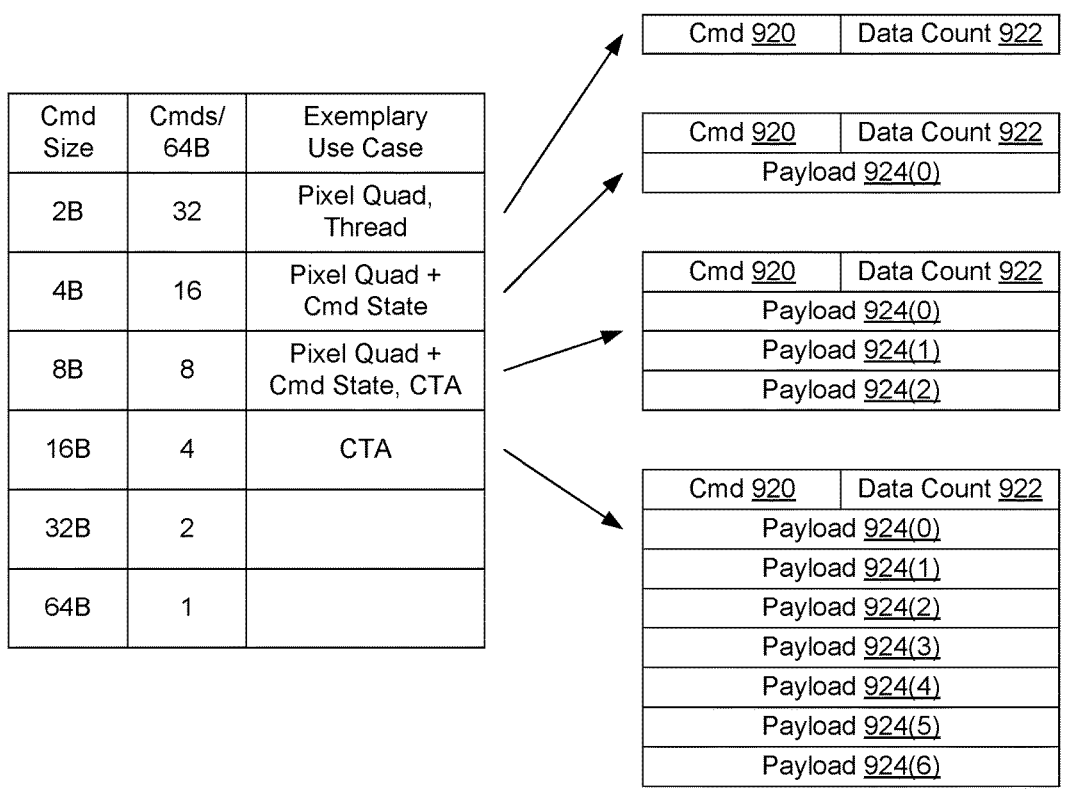
FIG. 9B illustrates exemplary command queue entry structures, in accordance with one embodiment.

FIG. 9B illustrates exemplary command queue entry structures, in accordance with one embodiment. As shown, a two byte (2 B) command includes a command (Cmd) field 920 and a data count field 922, which specifies how much associated data (stored in data queue) the command requires. A four byte (4 B) command includes command field 920, data count field 922, and a payload field 924(0). An eight byte (8 B) command includes command field 920, data count field 922, and a payload fields 924(0)-924(2). Larger commands may scale with additional payload fields. In various embodiments, larger command sizes may or may not be supported. Note that payload data is meant for conveying command setup data to the queue manager (e.g., QM 830) that should be acted upon prior to execution of a corresponding command. However, payload may also be conveyed into the execution unit as part of the command.

Figure 9C:
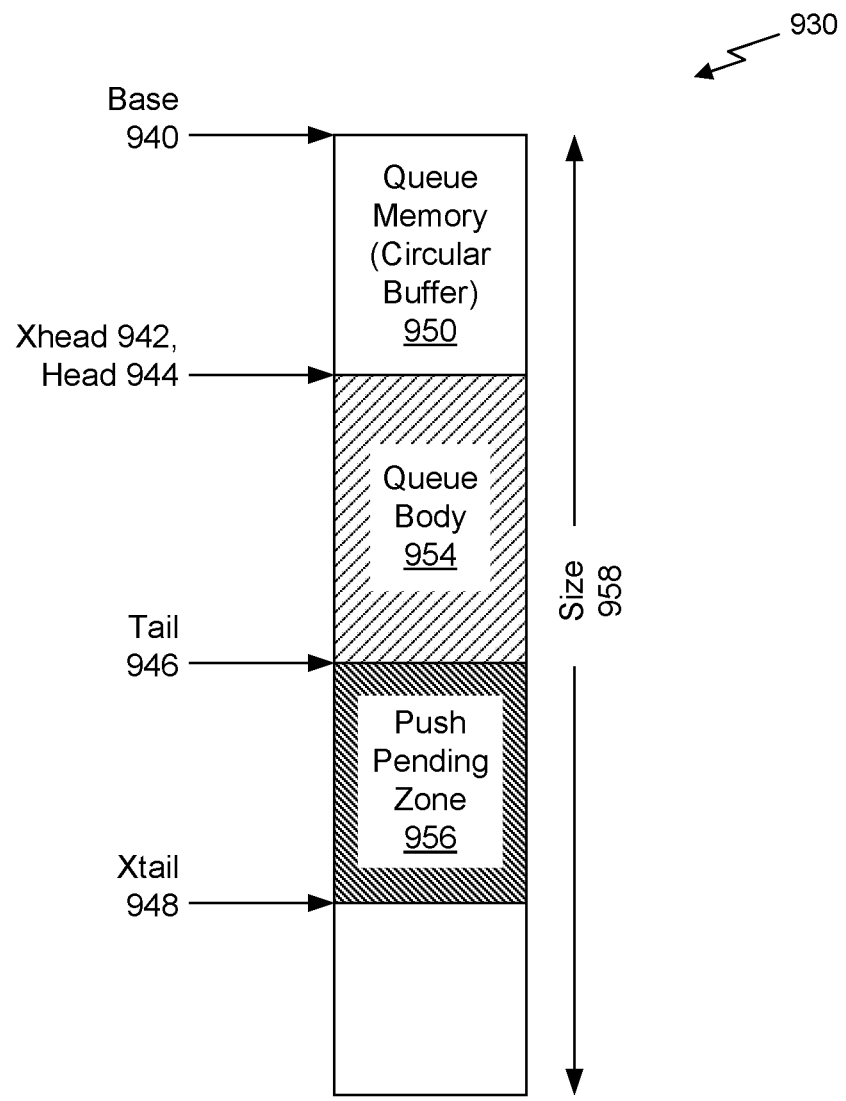
FIG. 9C illustrates an exemplary structure for a circular queue with no entries in a pop pending zone, in accordance with one embodiment.

FIG. 9C illustrates an exemplary structure for a circular queue 930 with no entries in a pop pending zone, in accordance with one embodiment. Circular queue 930 is a construct implemented in system memory and/or cache memory allocated to be a queue memory 950. The circular queue 930 has a size 958, which may be specified in bytes of storage. A queue body 954 includes entries between the head and tail of the circular queue. A push pending zone 956 includes space for at least one entry that is in the process of being pushed. After an inbound command[ ] is accepted, a queue manager (e.g., QM 718, QM 830) pushes the command[ ] onto a command queue. The queue manager may perform an atomic operation to push the inbound command[ ] on to the command queue. However, data associated with the command[ ] may be subsequently written into the data queue over an arbitrary time period. Until the data associated with the command[ ] is completely written, a queue entry for the data is not valid to be popped, but an allocation for the data may need to be held as the data is written.

A base pointer 940, a size 958, an extended head (xhead) pointer 942, a head pointer 944, a tail pointer 946, and an extended tail (xtail) pointer 948 are used to manage queue operation. Base pointer 940 points to the starting address in memory for the circular queue 930. Head pointer 944 and tail pointer 946 bound all valid queue entries. A region in memory between the extended tail pointer 948 and the tail pointer 946 define a push pending zone 956. Similarly, a region in memory between the extended head pointer 942 and the head pointer 944 define a pop pending zone, shown here to be zero in size because the extended head pointer 942 and the head pointer 944 point to the same location. In one embodiment, a flag and supporting circuitry are configured to disambiguate full from empty when the head and tail pointers are equal.

Pointers advance away from the base pointer 940, and wrap around back to the based pointer 940 upon exceeding the size 958 point in memory. As queue space is reserved, used, and released, pointers advance and wrap, creating an effectively circular space in memory for performing push and pop operations. Note that address scrubber 740 may enforce the circular space on LD/ST commands from/to data queues, so a given client unit does not need to perform related operations.

A command queue may be implemented as a first instance of circular queue 930. Respective head pointers, tail pointers, extended head pointers, and extended tail pointers for both the command queue and the data queue may be configured to advance synchronously. In the command queue, a pointer may advance according to the size of a command entry being pushed or popped; in the data queue, a pointer may advance according to the size of data associated with the command entry being pushed or popped. Consequently, pending push zones and pending pop zones for both the command queue and data queue may be configured to reserve space and collapse space synchronously in respective queues.

Figure 9D:
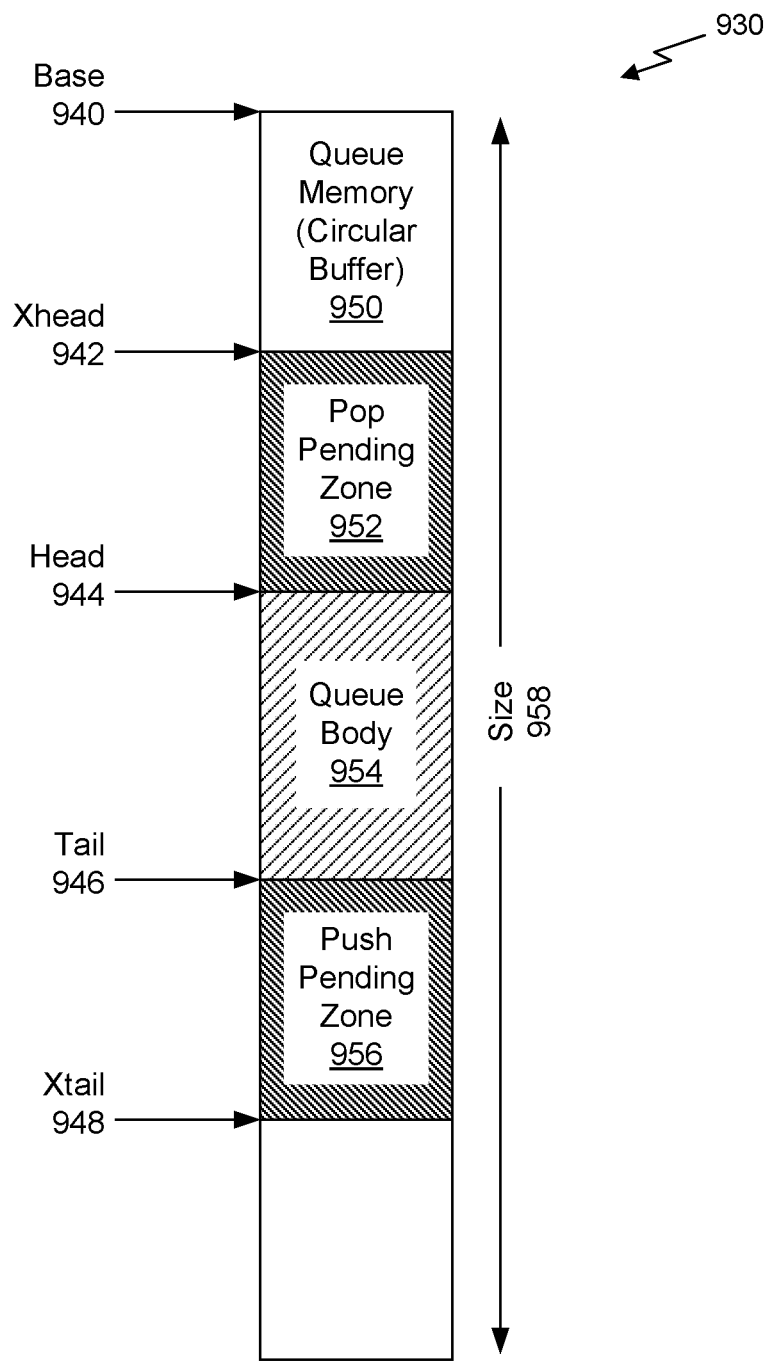
FIG. 9D illustrates an exemplary structure for a circular queue with entries in both a pop pending zone and a push pending zone, in accordance with one embodiment.

FIG. 9D illustrates an exemplary structure for circular queue 930 with entries in both a pop pending zone and a push pending zone, in accordance with one embodiment. As shown, circular queue 930 includes a non-zero amount of space reserved as a pop pending zone 952. This structure can be used for data queues, where push and pop operations are deferred relative to corresponding command push and pop operations.

Figure 10:
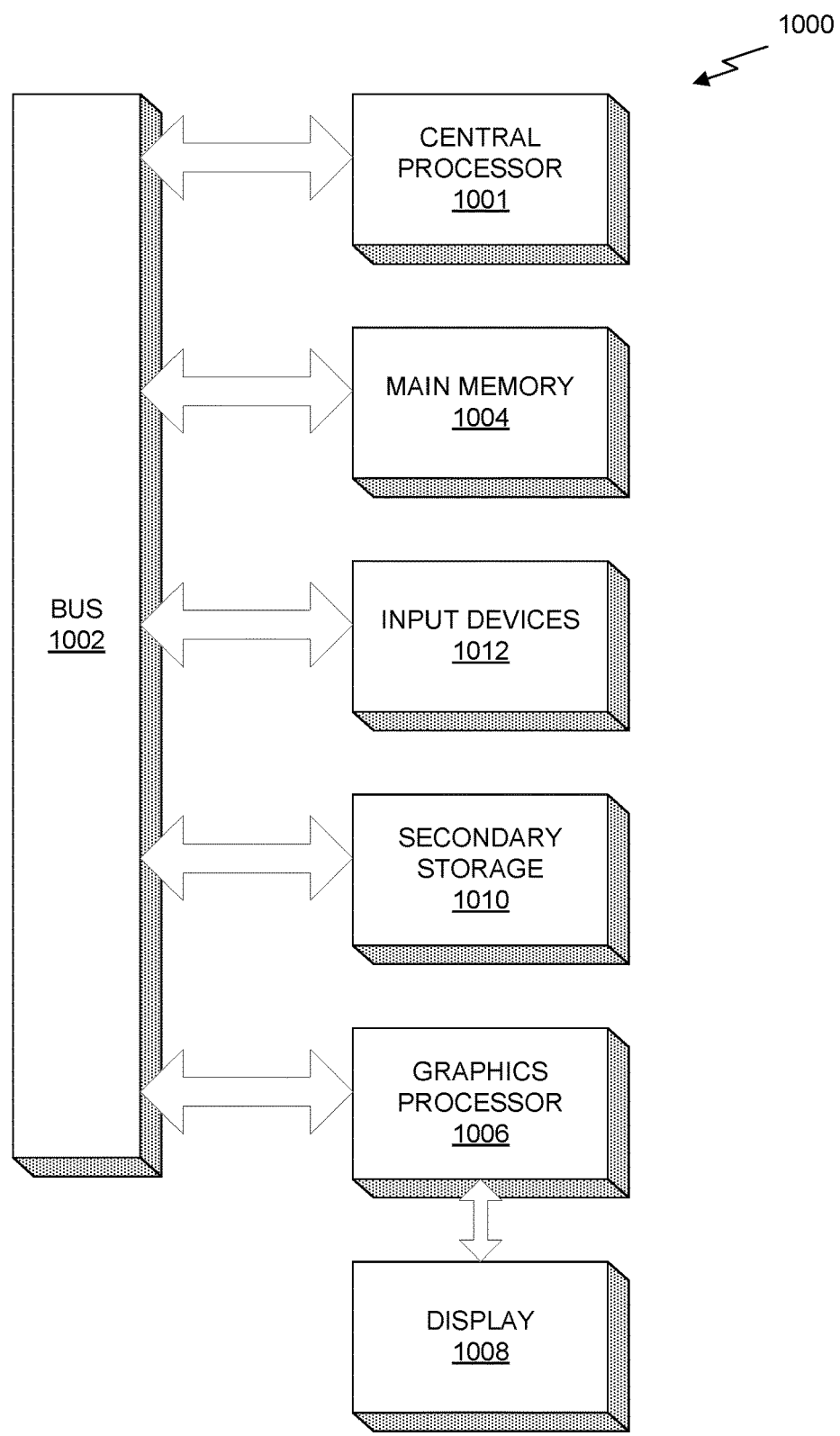
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU). In one embodiment, graphics processor 1006 includes an instance of a queue manager, configured according to the present disclosure. In such an embodiment, the queue manager facilitates command and data communication among different hardware modules (e.g., shader modules, rasterization module, etc.) within the graphics processor 1006.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a cache unit associated with a memory, wherein a plurality of command queues are implemented in a first memory space mapped to the cache unit and a plurality of data queues are implemented in a second memory space mapped to the cache unit; and
circuitry in communication with the cache unit and configured to:
receive an inbound command of a first width from a first processing unit;
convert the inbound command into one or more scalar format commands;
store the one or more scalar format commands in at least one of the command queues by transmitting one or more write requests to the cache unit;
transmit, in connection with the inbound command, one or more pointers to the first processing unit, wherein each pointer in the one or more pointers indicates a memory address in the second memory space that is utilized by the first processing unit for storing data in at least one of the data queues,
select a first command queue;
read at least one scalar format command from the first command queue by transmitting at least one read request to the cache unit;
convert the at least one scalar format command into an outbound command of a second width;
transmit the outbound command to a second processing unit configured to process the outbound command; and
transmit the one or more pointers to the second processing unit, wherein the second processing unit is configured to load data from the cache unit in connection with the outbound command.

2. The apparatus of claim 1, wherein the at least one scalar format command read from the first command queue comprises at least one of the one or more scalar format commands converted from the inbound command.

3. The apparatus of claim 1, wherein the second processing unit and the first processing unit are the same processing unit.

4. The apparatus of claim 1, wherein at least one of the first processing unit or the second processing unit includes at least one of a streaming multiprocessor, a texture module, or a raster operations pipeline.

5. The apparatus of claim 1, wherein the circuitry is further configured to dynamically change a destination of the outbound command from the second processing unit to a third processing unit.

6. The apparatus of claim 1, wherein the circuitry is further configured to set at least one bit that, upon being set, maintains the at least one scalar format command associated with the outbound command in the first command queue after the outbound command is transmitted to the second processing unit for reuse.

7. The apparatus of claim 1, wherein the command queues have priorities associated therewith that dictate a priority with which commands stored therein are processed.

8. The apparatus of claim 1, wherein the one or more pointers are calculated by a prefix-sum adder circuit based on at least a first data size.

9. The apparatus of claim 8, wherein the first data size is associated with the one or more scalar format commands.

10. The apparatus of claim 1, wherein a first data queue of the plurality of data queues is a first circular queue of a first size; and the first command queue is a second circular queue of a second size, and wherein the first data queue and the first command queue are paired.

11. The apparatus of claim 10, wherein the first circular queue includes a first base pointer configured to point to a starting memory address for the first circular queue, a first head pointer, a first extended head pointer, a first tail pointer, and a first extended tail pointer; and the second circular queue includes a second base pointer configured to point to a starting memory address for the second circular queue, a second head pointer, a second extended head pointer, a second tail pointer, and a second extended tail pointer.

12. The apparatus of claim 11, wherein a first pointer of the one or more pointers references a push pending zone disposed in memory between the first tail pointer and the first extended tail pointer.

13. The apparatus of claim 11, further comprising a state queue metadata array configured to store and update at least the first head pointer, the first extended head pointer, the first tail pointer, the first extended tail pointer; the second head pointer, the second extended head pointer, the second tail pointer, and the second extended tail pointer.

14. The apparatus of claim 1, further comprising an address scrubber configured to accept a memory access request for one of the plurality of data queues if the memory access request includes an address within a predefined memory address range, and to reject the memory access request if the address is not within the predefined memory address range.

15. The apparatus of claim 1, further comprising a command queue head cache, configured to store command queue head entries comprising the one or more scalar format commands.

16. The apparatus of claim 1, further comprising a queue chomper circuit, configured to convert the at least one scalar format command into the outbound command, wherein only sequential, compatible scalar format commands in the first command queue are included in the outbound command.

17. The apparatus of claim 1, further comprising circuitry for determining whether the inbound command can be accommodated based on at least a data size for the inbound command and space available within one of the data queues.

18. A method, comprising:
receiving an inbound command of a first width from a first processing unit;
converting the inbound command into one or more scalar format commands;
storing the one or more scalar format commands in at least one of a plurality of command queues implemented in a first memory space mapped to a cache unit by transmitting one or more write requests to the cache unit, wherein a plurality of data queues are implemented in a second memory space mapped to the cache unit;
transmitting, in connection with the inbound command, one or more pointers to the first processing unit, wherein each pointer in the one or more pointers indicates a memory address in the second memory space that is utilized by the first processing unit for storing data in at least one of the data queues;
selecting a first command queue;
reading at least one scalar format command from the first command queue by transmitting at least one read request to the cache unit;
converting the at least one scalar format command into an outbound command of a second width;
transmitting the outbound command to a second processing unit for processing the outbound command; and
transmitting the one or more pointers to the second processing unit, wherein the second processing unit is configured to load data from the cache unit in connection with the outbound command.

19. A computer program product comprising computer executable instructions stored on a non-transitory computer readable medium that when executed by a processor instruct the processor to:
receive an inbound command of a first width from a first processing unit;
convert the inbound command into one or more scalar format commands;
store the one or more scalar format commands in at least one of a plurality of command queues implemented in a first memory space mapped to a cache unit by transmitting one or more write requests to the cache unit, wherein a plurality of data queues are implemented in a second memory space mapped to the cache unit;
transmitting, in connection with the inbound command, one or more pointers to the first processing unit, wherein each pointer in the one or more pointers indicates a memory address in the second memory space that is utilized by the first processing unit for storing data in at least one of the data queues;
select a first command queue;
read at least one scalar format command from the first command queue by transmitting at least one read request to the cache unit;
convert the at least one scalar format command into an outbound command of a second width;
transmit the outbound command to a second processing unit for processing the outbound command; and
transmitting the one or more pointers to the second processing unit, wherein the second processing unit is configured to load data from the cache unit in connection with the outbound command.

* * * * *